United States Patent
Suzuki et al.

(10) Patent No.: US 6,373,597 B1
(45) Date of Patent: Apr. 16, 2002

(54) FACSIMILE SIGNAL TRANSMISSION SYSTEM

(75) Inventors: Shigeaki Suzuki; Nobuyoshi Horie, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/283,570

(22) Filed: Apr. 1, 1999

(30) Foreign Application Priority Data

Apr. 2, 1998 (JP) .......................................... 10-089732

(51) Int. Cl.⁷ ............................ H04N 1/32; H04M 11/00
(52) U.S. Cl. ........................ 358/434; 358/442; 358/468; 379/100.17
(58) Field of Search ................................. 358/400, 442, 358/434, 468; 379/100.17

(56) References Cited

U.S. PATENT DOCUMENTS

| | | | | |
|---|---|---|---|---|
| 4,910,610 A | | 3/1990 | Utsugi ......................... 358/434 |
| 5,117,453 A | | 5/1992 | Piasecki et al. ......... 379/100.17 |
| 5,216,519 A | * | 6/1993 | Daggett et al. ............. 358/434 |
| 5,243,438 A | | 9/1993 | Anderton et al. ........... 358/468 |
| 5,307,174 A | * | 4/1994 | Saito ........................... 358/400 |
| 5,488,653 A | * | 1/1996 | Dimolitsas et al. .... 379/100.17 |
| 5,491,565 A | | 2/1996 | Naper ......................... 358/468 |
| 5,493,610 A | | 2/1996 | Suzuki et al. .......... 379/100.17 |
| 5,657,134 A | | 8/1997 | Numata et al. ............. 358/434 |

FOREIGN PATENT DOCUMENTS

| | | |
|---|---|---|
| EP | 0478205 A2 | 4/1992 |
| JP | 63031366 A | 2/1988 |
| JP | 6133135 | 5/1994 |
| WO | 9702697 | 1/1997 |
| WO | 9839892 | 9/1998 |

* cited by examiner

Primary Examiner—Kimberly A. Williams

(57) ABSTRACT

A facsimile signal transmission system which satisfies the stipulation of the signal sending time and the stipulation of the signal time interval for enabling successful facsimile communication even if a detection delay or a sending delay occurs. In a facsimile signal transmission system for transmitting a digital command signal (DCS signal), an echo protect tone signal (EPT signal), a training signal, and a training check signal, if an IDLE message signal output from a transmission part at the end of the DCS signal is received in a reception party, a first timer operated for a first predetermined time is started. When the first predetermined time has elapsed, sending of the EPT signal to the reception facsimile terminal is started. A second timer operated for a second predetermined time is started at the same time as sending of the EPT signal is started. When the second predetermined time has elapsed, sending of the EPT signal is terminated. A third timer operated for a third predetermined time is started at the same time as sending of the EPT signal is terminated. When the third predetermined time has elapsed, sending of the training signal to the reception facsimile terminal is started.

18 Claims, 22 Drawing Sheets

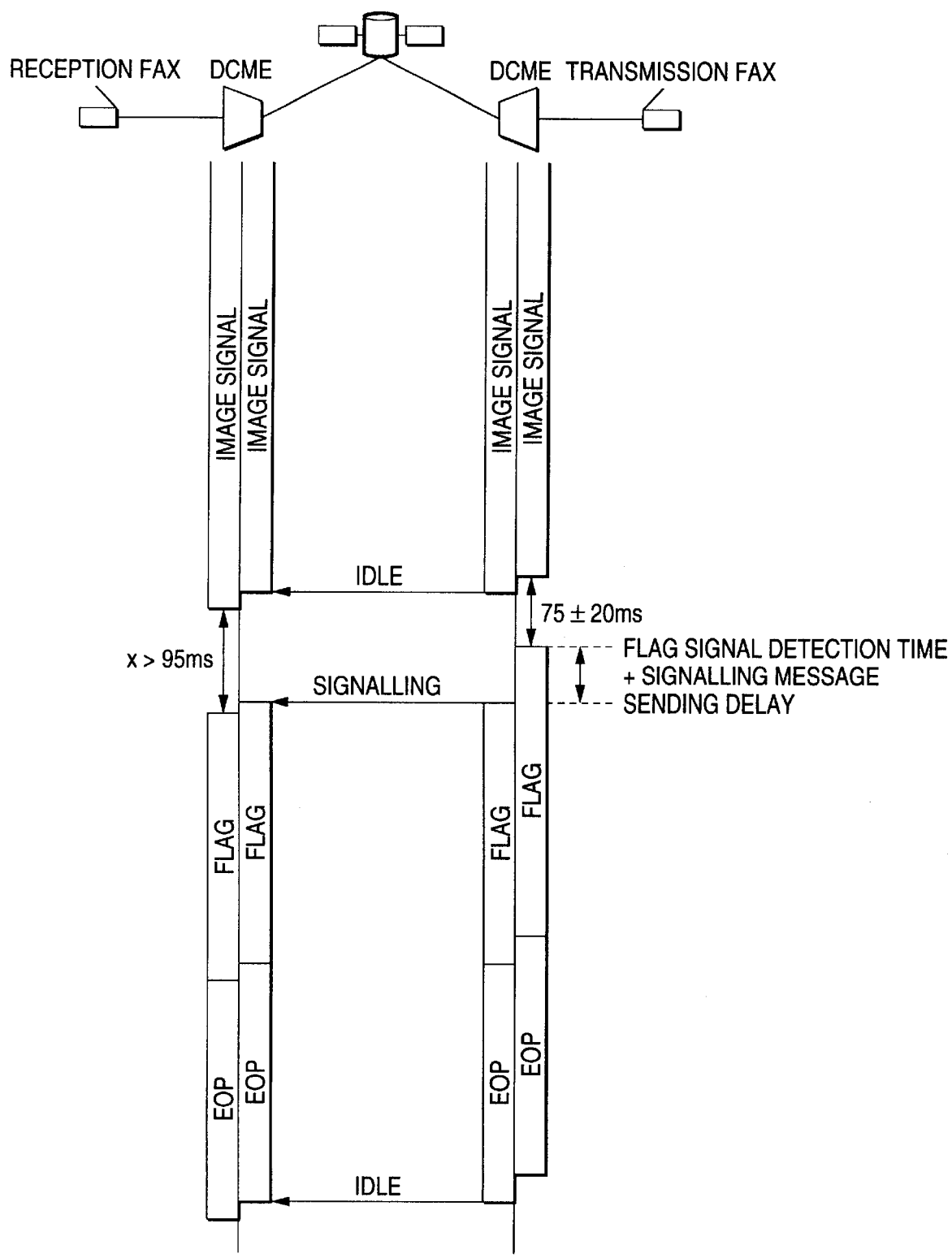

FACSIMILE SIGNAL TRANSMISSION SYSTEM

BACKGROUND OF THE INVENTION

This invention relates to a facsimile signal transmission system for enhancing facsimile signal transmission efficiency in facsimile communication in an international public switched network, an intra-enterprise communication network, etc.

In a facsimile signal transmission system, a DCS signal, an EPT signal, a training signal, a TCF signal, an image signal, and a control signal of facsimile signals are output from a transmission facsimile terminal to a reception facsimile terminal in sequence, whereby the facsimile signals are transmitted.

The DCS signal is a digital command signal of a facsimile signal output from the transmission facsimile terminal. It is output after a digital identification signal (DIS) of a facsimile signal output from the reception facsimile terminal is received. The capabilities of the reception facsimile terminal (modulation system, modulation speed, receivable original picture sizes, resolution, etc.,) are recognized according to the received DIS and are compared with the capabilities of the transmission facsimile terminal for judging communicatable capabilities. The judgement result is returned to the reception facsimile terminal as the DCS signal.

The EPT signal is an echo protect tone signal for instructing an echo canceller existing in a transmission path for facsimile communication to stop the operation. After the signal is received, the echo canceller existing in the transmission path stops the echo cancel operation.

The training signal is a signal for training a reception section (demodulation section) in the reception facsimile terminal so as to correctly receive the image signal and the TCF signal.

According to the signal, a synchronizing circuit, an adaptive equalizer, and the like in the demodulation section are trained for the functions required for correctly receiving the image signal.

The TCF signal is a training check signal for checking to see if the circuits, etc., are trained correctly by the training signal so that later the image signal can be received correctly. It is a signal with "0" data modulated for 1.5 seconds and is used to determine whether or not "0" can be received correctly for a given time at the reception facsimile terminal.

The image signal is a signal for indicating original picture data.

The control signal includes the DCS signal, an EOP signal, etc. The EOP signal is a signal for indicating the end of original data transmission.

After the signals are transmitted and received, a facsimile communication termination procedure is executed.

A flag signal is transmitted before the facsimile control signals (DCS signal, EOP signal, etc.,) other than the TCF signal or the image signal. It is a synchronizing signal for receiving the control signals. The flag signal is a signal with "7E" data modulated for one second.

An example of facsimile signal transmission equipment in a related art is a digital circuit multiplication equipment (DCME) applied to an international public switched network. Facsimile signal transmission system for DCME is described in ITU-T Recommendation G.766 and a part of the facsimile signal transmission system in the digital circuit multiplication equipment is shown in FIGS. 17 to 20.

FIG. 17 is a flowchart in the facsimile signal transmission system for transmission DCME to output a DCS signal, an EPT signal, a training signal, And a TCF signal output from a transmission facsimile terminal to reception DCME.

FIG. 18 is a flowchart in the facsimile signal transmission system for the reception DCME to output the DCS signal, the EPT signal, the training signal, and the TCF signal of the facsimile signals output from the transmission DCME to a reception facsimile terminal.

FIG. 19 is a flowchart in the facsimile signal transmission system for the transmission DCME to output an image signal and a control signal output from the transmission facsimile terminal to the reception DCME.

FIG. 20 is a flowchart in the facsimile signal transmission system for the reception DCME to output the image signal and the control signal of the facsimile signals output from the transmission DCME to the reception facsimile terminal.

Next, the operation will be discussed.

First, a transmission system of the DCS signal, the EPT signal, the training signal, and the TCF signal in the DCME will be discussed. For convenience of the description, FIG. 21 shows a transmission sequence of these signals between the transmission facsimile terminal and the reception facsimile terminal.

The transmission facsimile terminal sends the DCS signal, one of facsimile control signals, indicating the capabilities of the transmission facsimile terminal such as the modulation system, the modulation speed, and receivable image resolution in accordance with transmission sequence defined in ITU-T Recommendation T.30, then sends the EPT signal for 185 ms to 200 ms in a silent time of 75 ms±20 ms and subsequently sends the training signal and the TCF signal in a silent time of 20 ms to 25 ms.

As shown in FIGS. 17 and 21, the transmission DCME detects the end of the DCS signal, then sends an IDLE message signal indicating the end of the DCS signal to the reception DCME. Subsequently, the transmission DCME sends an EPT massage signal after detecting the EPT signal, an END_EPT message signal after detecting the end of the EPT signal, a TRAINING message signal after detecting the training signal, and a FAX_DATA message signal after detecting the end of the training signal to the reception DCME (ST80 to ST87). After this, the transmission DCME sends the TCF signal to the reception DCME.

On the other hand, as shown in FIGS. 18 and 21, after receiving the EPT message signal from the transmission DCME (ST91), the reception DCME sends the EPT signal to the reception facsimile terminal (ST92) until reception of the END_EPT message signal (ST93). Next, after receiving the TRAINING message signal from the transmission DCME (ST94), the reception DCME sends the training signal to the reception facsimile terminal (ST95) until reception of the FAX_DATA message signal (ST96).

Next, a transmission system of the image signal and the control signal in the DCME will be discussed. For convenience of the description, FIG. 22 shows a transmission sequence of these signals between the transmission facsimile terminal and the reception facsimile terminal. It shows a sequence for transmitting an original of only one page between the facsimile terminals as an example.

The transmission facsimile terminal sends facsimile image signal corresponding to one page of facsimile image, then sends a flag signal in a silent time of 75 ms±20 ms and subsequently an end-of-procedures signal (EOP signal), one of the facsimile control signals.

As shown in FIGS. 19 and 22, the transmission DCME detects the end of the image signal (ST100), then sends an IDLE message signal indicating the end of the image signal to the reception DCME (ST101). Subsequently, the transmission DCME detects the flag signal (ST102), then sends a SIGNALLING message signal (ST103), then sends flag and EOP signals.

On the other hand, as shown in FIGS. 20 and 22, the reception DCME receives the SIGNALLING message signal from the transmission DCME (ST111), then sends the flag signal and the EOP signal received from the transmission DCME to the reception facsimile terminal.

Since the facsimile signals are thus transmitted between transmission and reception facsimile terminals in the facsimile signal transmission system in the related art, it is feared that the time interval of facsimile signal sent from the transmission facsimile terminal defined in Recommendation T.30 may not be held. Specifically, in FIG. 21, it is feared that the EPT message signal may arrive at the reception DCME after the expiration of 95 ms or more because of detection delay of the EPT signal in the transmission DCME and sending delay of the EPT message signal to the reception DCME. In this case, the time interval between the DCS signal sending end and the EPT signal sending start in the reception DCME becomes 95 ms or more. It is also feared that the EPT sending time to the reception facsimile terminal may become shorter than the stipulated time.

Further, it is feared that the TRAINING message signal may arrive at the reception DCME after the expiration of 25 ms or more because of detection delay of the training signal in the transmission DCME and sending delay of the TRAINING message signal to the reception DCME. In this case, the time interval between the EPT signal sending end and the training signal sending start in the reception DCME becomes 25 ms or more.

Likewise, in FIG. 22, it is feared that the SIGNALLING message signal may arrive at the reception DCME after the expiration of 95 ms or more because of detection delay of the flag signal in the transmission DCME and sending delay of the SIGNALLING message signal to the reception DCME. In this case, the time interval between the image signal sending end and the EOP signal sending start in the reception DCME becomes 95 ms or more.

If a signal not satisfying the time interval defined in Recommendation T.30 as described above is received, the reception facsimile terminal judges that the signal is a communication error, and the communication erroneously terminates at the worst.

SUMMARY OF THE INVENTION

It is therefore an object of the invention to provide a facsimile signal transmission system which satisfies the stipulation of the signal sending time and the stipulation of the signal time interval for enabling successful facsimile communication even if a detection delay or a sending delay as described above occurs.

According to the invention, there is provided a facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, wherein if an IDLE message signal output from a transmission party at the end of the DCS signal is received in a reception party, a first timer operated for a first predetermined time is started, wherein when the first predetermined time has elapsed, sending of the EPT signal to the reception facsimile terminal is started, wherein a second timer operated for a second predetermined time is started at the same time as sending of the EPT signal is started, wherein when the second predetermined time has elapsed, sending of the EPT signal is terminated, wherein a third timer operated for a third predetermined time is started at the same time as sending of the EPT signal is terminated, and wherein when the third predetermined time has elapsed, sending of the training signal to the reception facsimile terminal is started.

If the TCF signal is received from a transmission party while the training signal is being sent, TCF signal data is stored until sending of the training signal terminates.

To output the TCF signal to the reception facsimile terminal, if a FAX_DATA message signal output from the transmission party at the end of the training signal is received in the reception party, the TCF signal is output to the reception facsimile terminal and on the other hand, while no FAX_DATA message signal is received, a dummy signal generated in the reception party is output to the reception facsimile terminal.

According to the invention, there is provided a facsimile signal transmission system for outputting a DCS signal, an EPT signal, a training signal, a TCF signal, an image signal, and a control signal of facsimile signals in sequence from a transmission facsimile terminal to a reception facsimile terminal, wherein if the end of the DCS signal is detected in a transmission party, a first timer operated for a first predetermined time is started, wherein when the first predetermined time has elapsed, an EPT message signal is sent to a reception party and a second timer operated for a second predetermined time is started, wherein when the second predetermined time has elapsed, an END_EPT message signal is sent to the reception party and a third timer operated for a third predetermined time is started, and wherein when the third predetermined time has elapsed, a TRAINING message signal is sent to the reception party and after the expiration of a predetermined training time, a FAX_DATA message signal is sent.

If the TCF signal is received from the transmission facsimile terminal in a training time end wait state, the TCF signal is stored until the end of the predetermined training time.

The TCF signal output from the transmission facsimile terminal is output to the reception party and on the other hand, while no TCF signal is received, a dummy signal generated in the transmission party is output to the reception party.

Fill data is used as the dummy signal.

According to the invention, there is provided a facsimile signal transmission system for outputting a DCS signal, an EPT signal, a training signal, a TCF signal, an image signal, and a control signal of facsimile signals in sequence from a transmission facsimile terminal to a reception facsimile terminal, wherein if an IDLE message signal output from a transmission party at the end of the image signal is received in a reception party, a timer operated for a predetermined time is started and wherein if a SIGNALLING message signal is received from a transmission party after the expiration of the predetermined time, sending of a flag signal received from the transmission party to the reception facsimile terminal is started and on the other hand, if no SIGNALLING message signal is received from the transmission party, a dummy signal generated in the reception party is sent to the reception facsimile terminal.

According to the invention, there is provided a facsimile signal transmission system for outputting a DCS signal, an EPT signal, a training signal, a TCF signal, an image signal, and a control signal of facsimile signals in sequence from a transmission facsimile terminal to a reception facsimile terminal, wherein if the end of the image signal is detected in a transmission party, a timer operated for a predetermined time is started, wherein a SIGNALLING message signal is output to a reception party after the expiration of the predetermined time, and wherein sending of a flag signal to the reception party is started and on the other hand, if flag signal transmission to the reception party is not started, a dummy signal generated in the transmission party is sent to the reception party.

Flag data is used as the dummy signal.

According to the invention, there is provided a facsimile signal transmission system for outputting a DCS signal, an EPT signal, a training signal, a TCF signal, an image signal, and a control signal of facsimile signals in sequence from a transmission facsimile terminal to a reception facsimile terminal, wherein a facsimile control signal output from a transmission party after the end of the image signal is not output from a reception party to the reception facsimile terminal and a second facsimile control signal output from the transmission party is output to the reception facsimile terminal.

According to the invention, there is provided a facsimile signal transmission system for outputting a DCS signal, an EPT signal, a training signal, a TCF signal, an image signal, and a control signal of facsimile signals in sequence from a transmission facsimile terminal to a reception facsimile terminal, wherein after the end of the image signal, a facsimile control signal is not output from a transmission part to a reception party and a second facsimile control signal output from the transmission facsimile terminal is output to the reception party.

BRIEF DESCRIPTION OF THE DRAWINGS

In the accompanying drawings:

FIG. 22 is a sequence diagram to describe the operation of the facsimile signal transmission system shown in FIGS. 19 and 20.

DETAILED DESCRIPTION OF THE PREFERRED EMBODIMENTS

Referring now to the accompanying drawings, there are shown preferred embodiments of the invention.

First Embodiment

Figure 1:
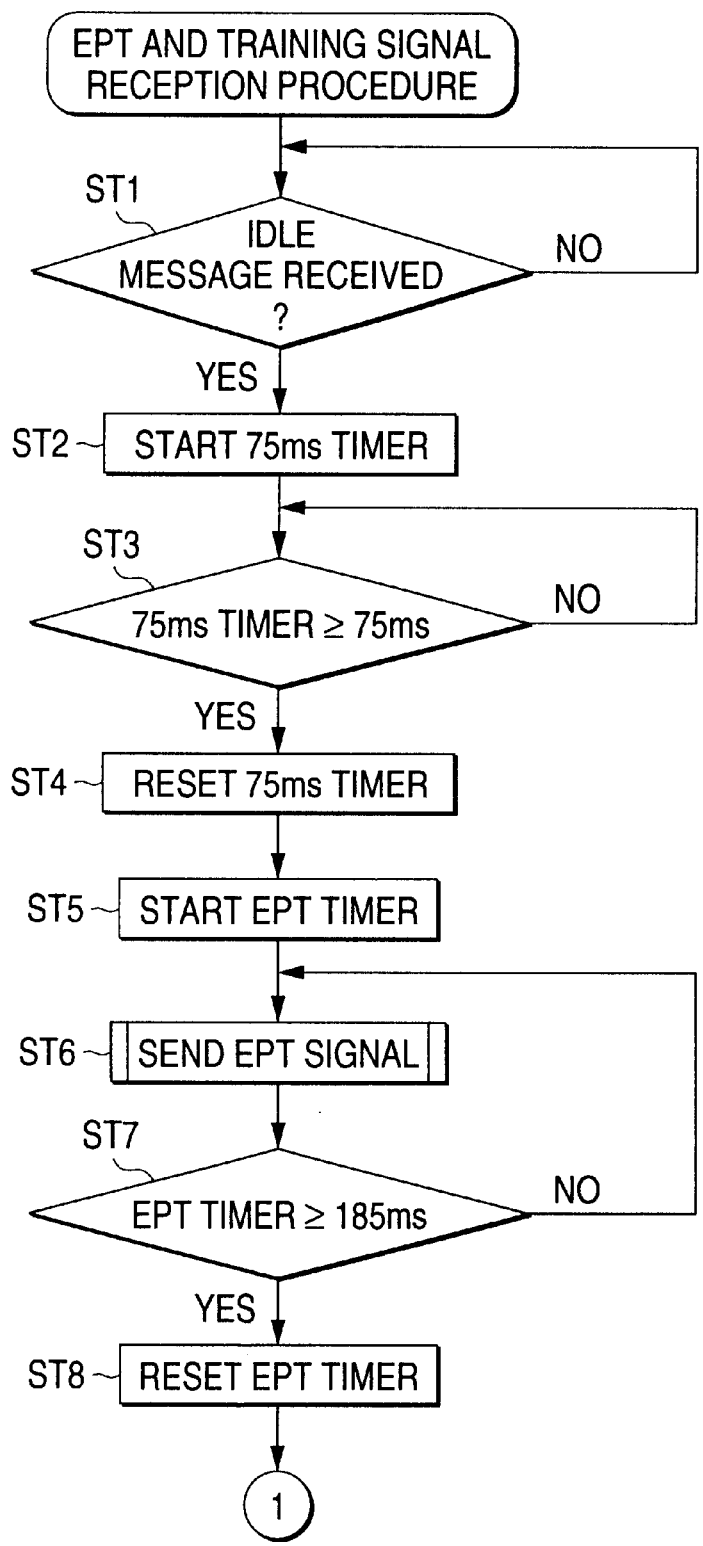
FIG. 1 is a flowchart to show the operation of a facsimile signal transmission system in a reception party according to a first embodiment of the invention.
Figure 2:
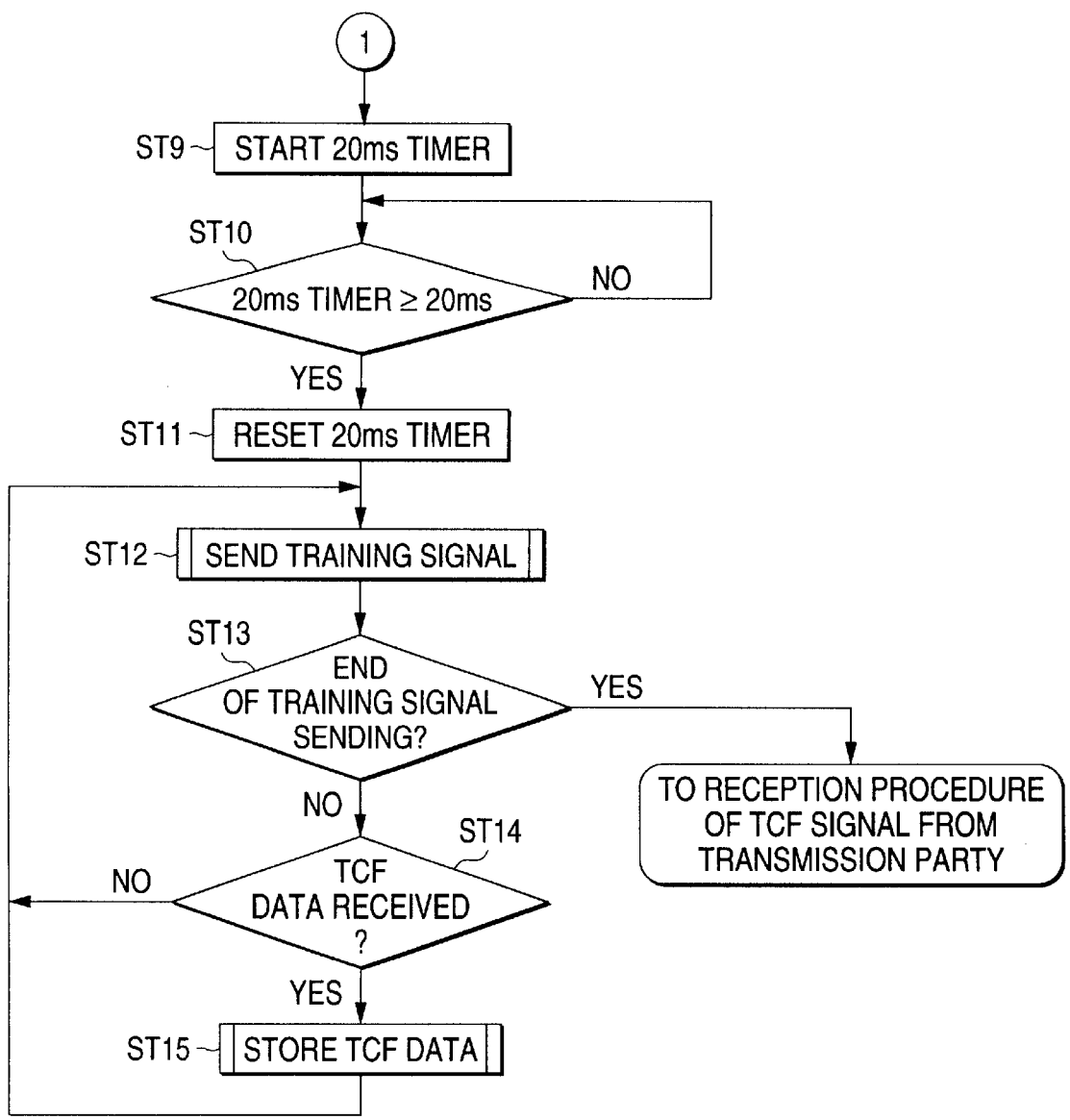
FIG. 2 is a flowchart following the flowchart in FIG. 1.

FIGS. 1 and 2 are flowcharts to show the operation of a facsimile signal transmission system according to a first embodiment of the invention in a reception party. In the figures, ST1 denotes means for determining whether or not an IDLE message signal indicating the end of a DCS signal has been received from a transmission party, ST2 denotes means for starting a 75-ms timer, ST3 denotes means for determining whether or not the value indicated by the 75-ms timer is 75 ms or more, ST4 denotes means for resetting the 75-ms timer, ST5 denotes means for starting an EPT timer, ST6 denotes means for sending an EPT signal to a reception facsimile terminal, ST7 denotes means for determining whether or not the value indicated by the EPT timer is 185 ms or more, and ST8 denotes means for resetting the EPT timer.

ST9 denotes means for starting a 20-ms timer, ST10 denotes means for determining whether or not the value indicated by the 20-ms timer is 20 ms or more, ST11 denotes means for resetting the 20-ms timer, ST12 denotes means for sending a training signal to a reception facsimile terminal, ST13 denotes means for determining whether or not the training signal has been sent to the reception facsimile terminal for a stipulated time, ST14 denotes means for determining whether or not TCF data has been received from the transmission party, and ST15 is means for storing the TCF data.

Next, the operation will be discussed.

Figure 3:
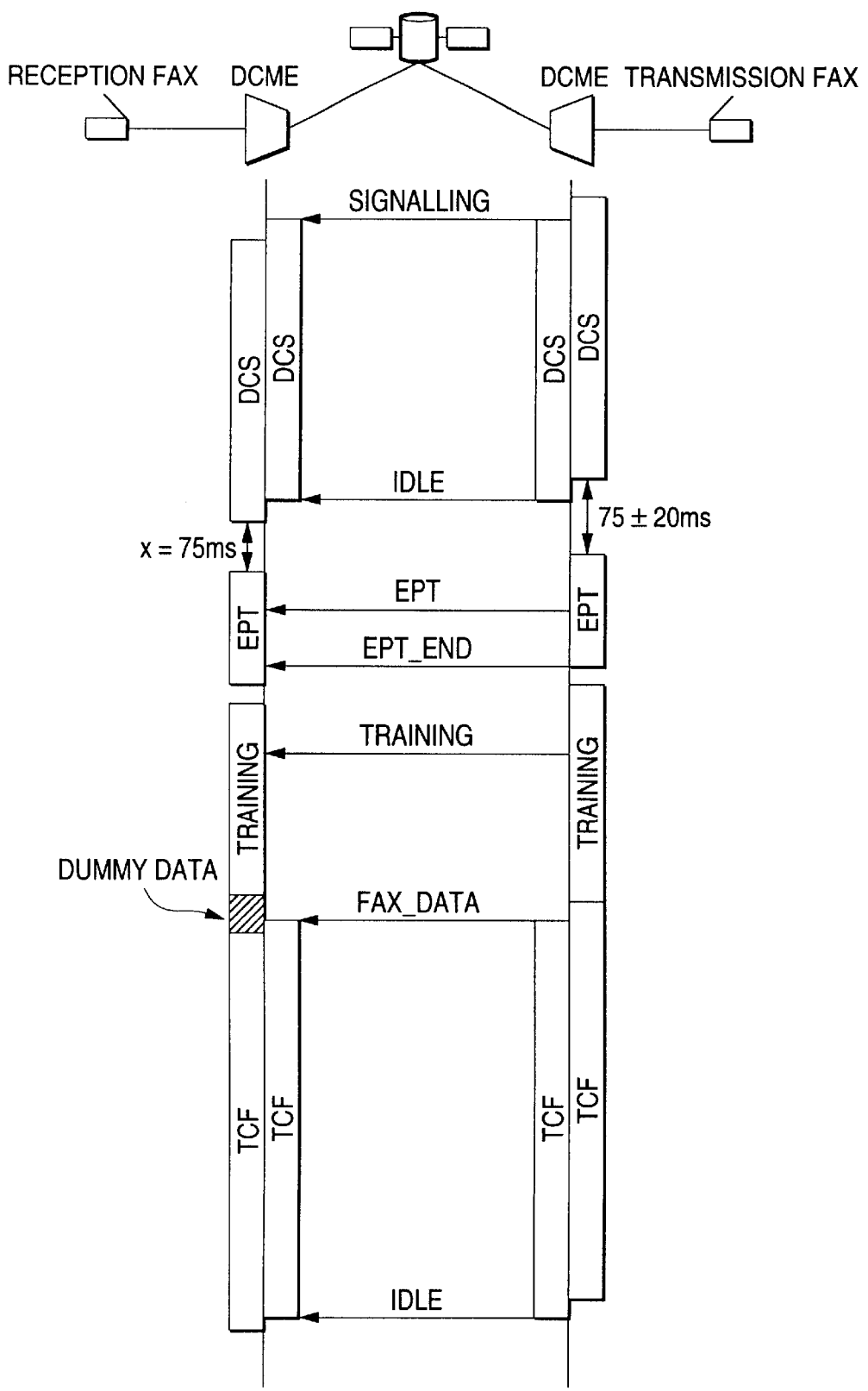
FIG. 3 is a sequence diagram to describe the operation of facsimile signal transmission system according to the first embodiment and a second embodiment of the invention.

For convenience of the description, the operation in transmission of a DCS signal, an EPT signal, and a training signal in DCME as shown in FIG. 3 will be discussed.

First, reception DCME receives an IDLE message signal from transmission DCME (ST1), then starts the 75-ms timer (ST2). When the value of the 75-ms timer becomes 75 ms or more (ST3) regardless of whether or not an EPT message signal is received, the reception DCME resets the 75-ms timer (ST4) and starts the EPT timer (ST5), then sends an EPT signal to a reception facsimile terminal (ST6) until the value of the EPT timer becomes 185 ms or more regardless of whether or not an END_EPT message signal is received. When the value of the EPT timer becomes 185 ms or more (ST7), the reception DCME resets the EPT timer (ST8) and starts the 20-ms timer (ST9). The reception DCME thus sends the EPT signal to the reception facsimile terminal for 185 ms in 75 ms after completion of sending a DCS signal.

Further, when the value of the 20-ms timer becomes 20 ms or more (ST10), the reception DCME resets the 20-ms timer (ST11) regardless of whether or not a TRAINING message signal is received, then sends a training signal to the reception facsimile terminal (ST12) until completion of sending-the training signal for a stipulated time regardless of whether or not a FAX_DATA message signal is received. Upon completion of sending the training signal for the stipulated time (ST13), the reception DCME sends a TCF signal from the transmission DCME to the reception facsimile terminal. If a TCF signal is received from the transmission DCME (ST14) while the training signal is being sent to the reception facsimile terminal, the received TCF data is stored (ST15).

As seen in the description made so far, according to the first embodiment, the EPT signal and the training signal are sent to the reception facsimile terminal for the stipulated time after the expiration of the stipulated time regardless of whether or not a message signal is received from the transmission party.

Resultantly, facsimile communication can be prevented from erroneously terminating.

Second Embodiment

Figure 4:
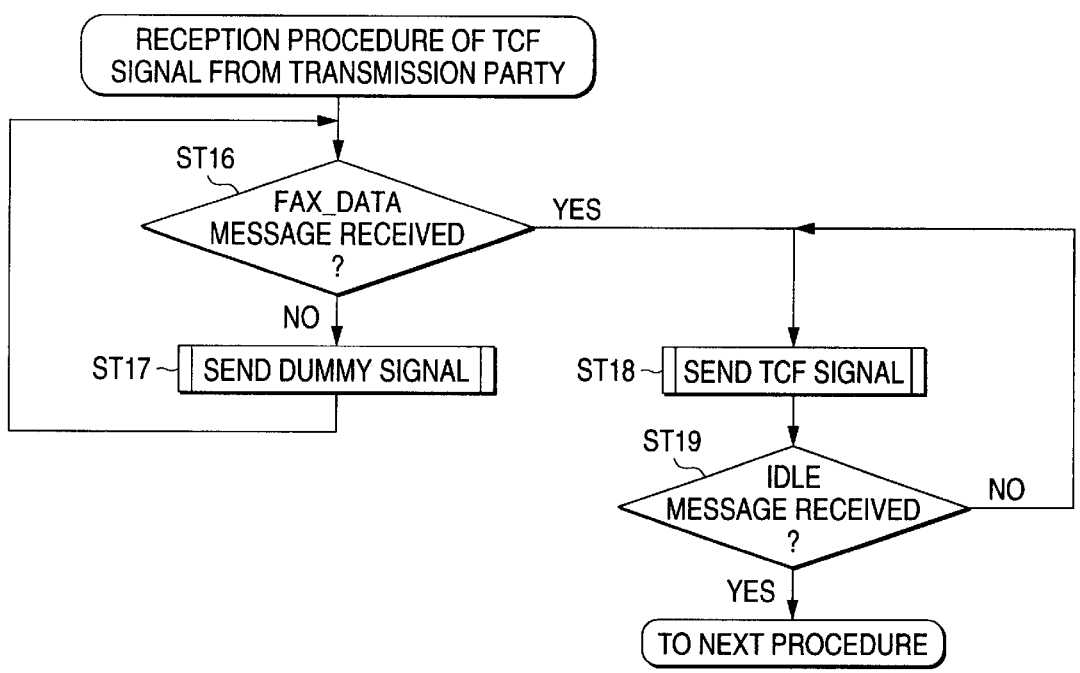
FIG. 4 is a flowchart to show the operation of facsimile signal transmission system in a reception party according to the second embodiment of the invention.

FIG. 4 is a flowchart to show the operation of a facsimile signal transmission system in a reception party according to a second embodiment of the invention. It shows a sending procedure of a TCF signal to a reception facsimile terminal following the first embodiment. In the figure, ST16 denotes means for determining whether or not a FAX_DATA message signal has been received, ST17 denotes means for sending a TCF signal to a reception facsimile terminal, ST18 denotes means for determining whether or not an IDLE message signal indicating the end of the TCF signal has been received from a transmission party, and ST19 denotes means for generating a dummy signal and sending the dummy signal to a reception facsimile terminal.

Next, the operation will be discussed.

For convenience of the description, the operation in transmission of a TCF signal in DCME as shown in FIG. 3 will be discussed.

First, whether or not a FAX_DATA message signal has been received from transmission DCME is determined (ST16). If the FAX_DATA message signal is not received, a TCF signal is not yet received from the transmission DCME, thus a dummy signal is sent to a reception facsimile terminal (ST17) until the FAX_DATA message signal is received. After the FAX_DATA message signal is received, a TCF signal is sent to the reception facsimile terminal (ST18) until an IDLE message signal indicating the end of TCF is received from the transmission DCME (ST19). Thus, after a training signal is sent to the reception facsimile terminal, output signals are sent to the reception facsimile terminal without a break and sending of the TCF signal can be completed correctly.

In the second embodiment, a dummy signal is sent to the reception facsimile terminal so that no break occurs between the training signal and the TCF signal. If fill data (00h) is used as a dummy signal, the reception facsimile terminal receives the correct TCF signal containing the dummy signal from the reception DCME, thus facsimile communication can be executed sucessfully.

Third Embodiment

Figure 5:
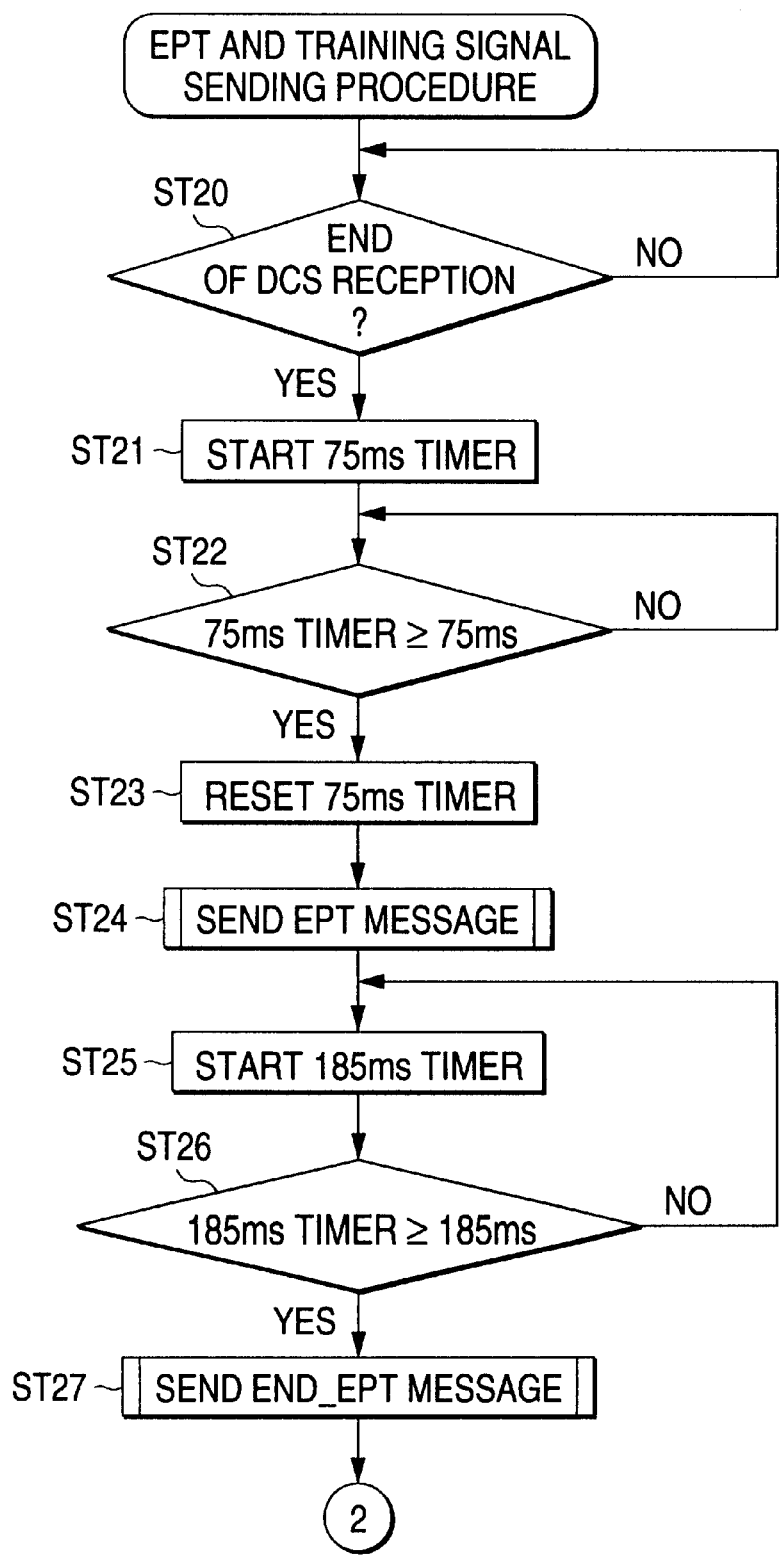
FIG. 5 is a flowchart to show the operation of a facsimile signal transmission system in a transmission party according to a third embodiment of the invention.
Figure 6:
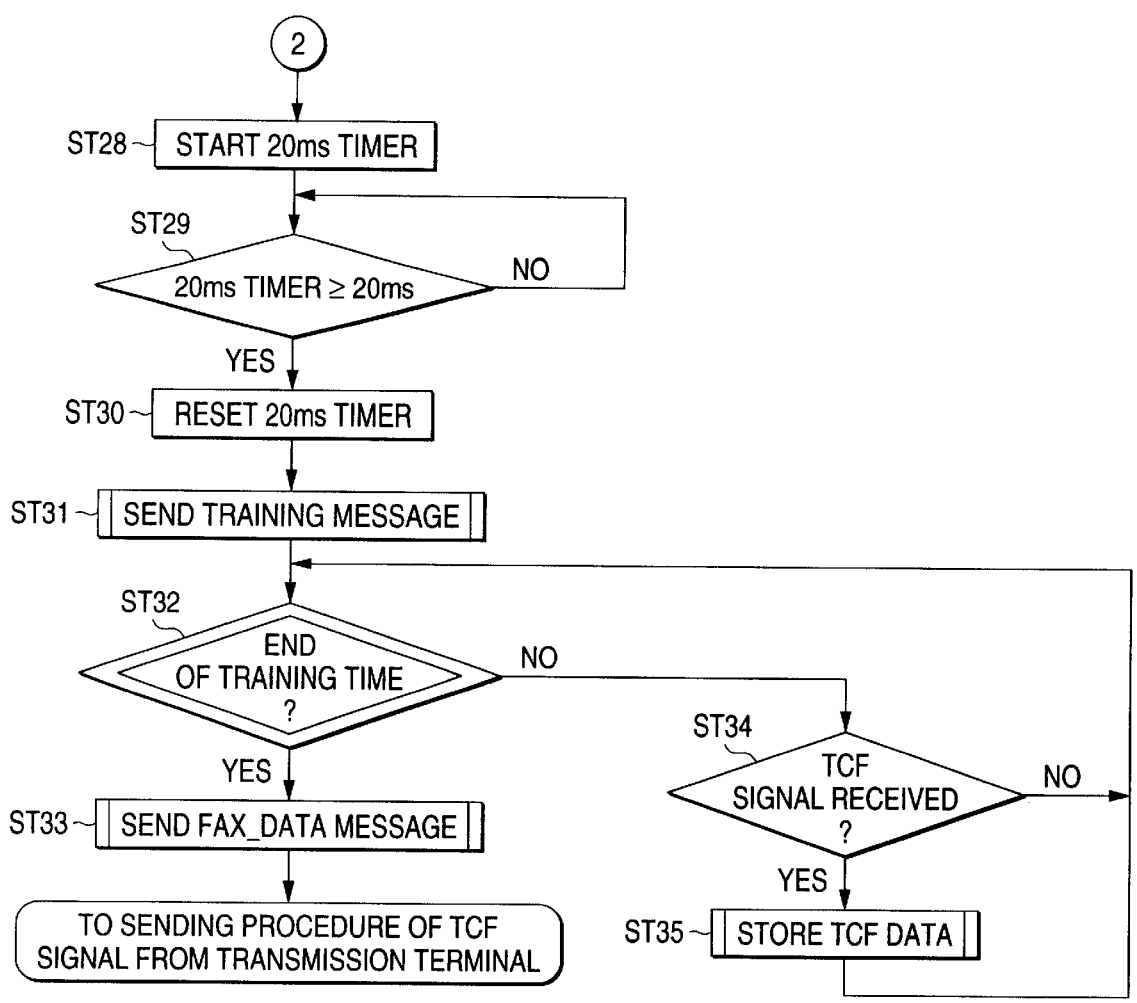
FIG. 6 is a flowchart following the flowchart in FIG. 5.

FIGS. 5 and 6 are flowcharts to show the operation of a facsimile signal transmission system according to a third embodiment of the invention in a transmission party. In the figures, ST20 denotes means for determining whether or not the end of a DCS signal from a transmission facsimile terminal has been detected, ST21 denotes means for starting a 75-ms timer, ST22 denotes means for determining whether or not the value indicated by the 75-ms timer is 75 ms or more, ST23 denotes means for resetting the 75-ms timer, ST24 denotes means for sending an EPT message signal to a reception party, ST25 denotes means for starting an EPT timer, ST26 denotes means for determining whether or not the value indicated by the EPT timer is 185 ms or more, and ST27 denotes means for sending an END_EPT message signal to the reception party.

ST28 denotes means for starting a 20-ms timer, ST29 denotes means for determining whether or not the value indicated by the 20-ms timer is 20 ms or more, ST30 denotes means for resetting the 20-ms timer, ST31 denotes means for sending a TRAINING message signal to reception DCME, ST32 denotes means for determining whether or not the expected training time has been elapsed, ST33 denotes means for sending a FAX_DATA message signal to the reception party, ST34 denotes means for determining whether or not a TCF signal has been received from the transmission facsimile terminal, and ST35 is means for storing TCF data.

Next, the operation will be discussed.

Figure 7:
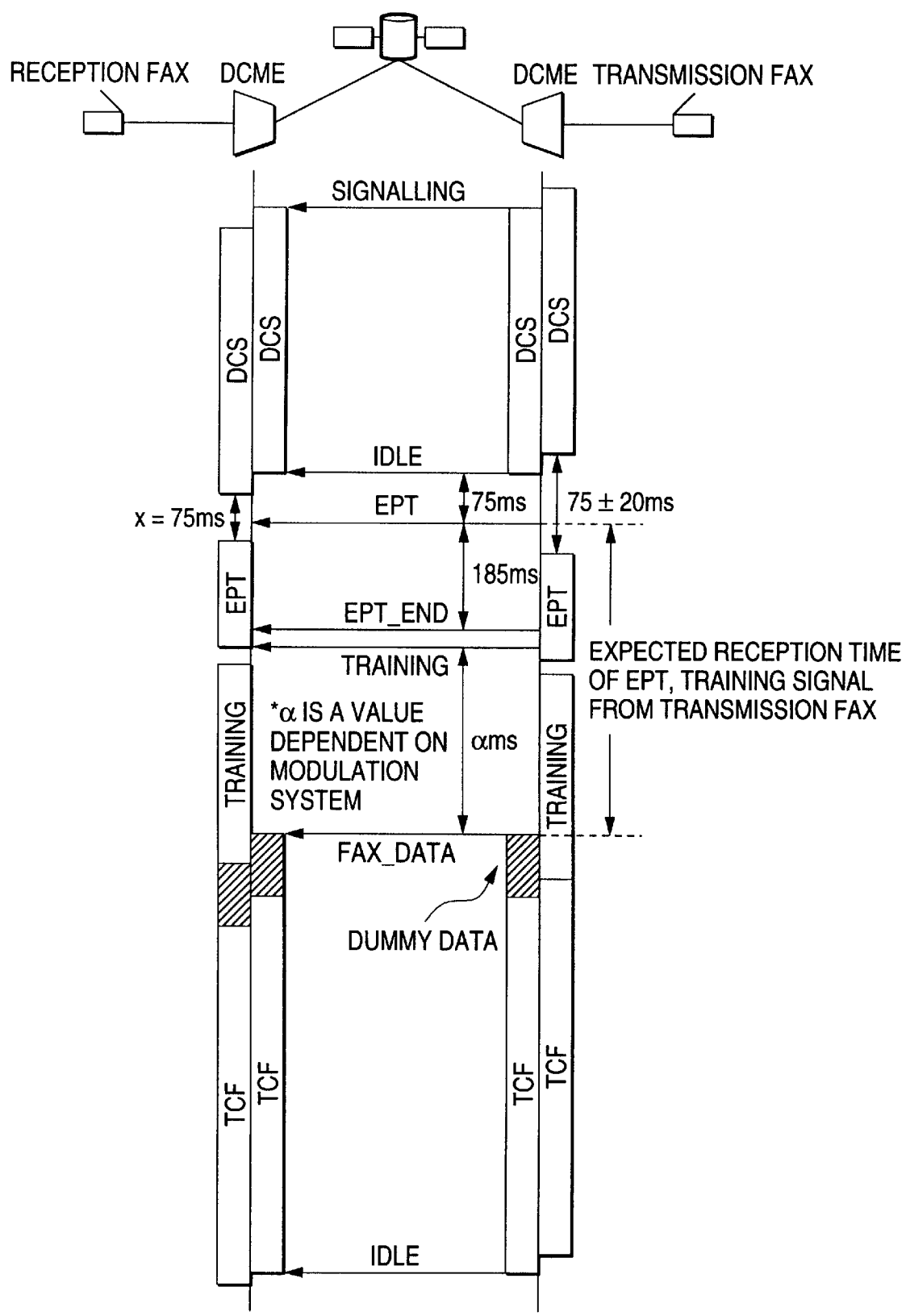
FIG. 7 is a sequence diagram to describe the operation of facsimile signal transmission system according to the third embodiment and a fourth embodiment of the invention.

For convenience of the description, the operation in transmission of a DCS signal, an EPT signal, and a training signal in DCME as shown in FIG. 7 will be discussed.

First, transmission DCME detects the end of a DCS signal from a transmission facsimile terminal (ST20), then starts the 75-ms timer (ST21). When the value of the 75-ms timer becomes 75 ms or more (ST22) regardless of whether or not an EPT signal is received from the transmission facsimile terminal, the transmission DCME resets the 75-ms timer (ST23) and starts the EPT timer (ST25), then sends an EPT message signal to reception DCME (ST24). When the value of the EPT timer becomes 185 ms or more (ST26) regardless of whether or not reception of the EPT signal from the transmission facsimile terminal terminates, the transmission DCME resets the EPT timer, starts the 20-ms timer (ST28), and sends an END_EPT message signal to the reception DCME (ST27). The transmission DCME thus sends the EPT message signal to the reception DCME in 75 ms after completion of sending the DCS signal and sends the END_ EPT message signal to the reception DCME in 185 ms after sending the EPT message signal.

Further, when the value of the 20-ms timer becomes 20 ms or more (ST29), the transmission DCME resets the 20-ms timer (ST30) regardless of whether or not a training signal is received from the transmission facsimile terminal, then sends a TRAINING essage signal to the reception DCME (ST31). When the expected reception time of the training signal from the transmission facsimile terminal has elapsed, for example, when the training signal time in a modem modulation system defined in ITU-T Recommendation V.29 has elapsed (ST32), the transmission DCME sends a FAX_DATA message signal to the reception DCME (ST33). If a TCF signal is received from the transmission facsimile terminal (ST34) while the training signal is being received, the received TCF data is stored (ST35).

As seen in the description made so far, according to the third embodiment, the EPT message signal, the EPT_END message signal, and the TRAINING message signal are sent to the reception DCME for the stipulated time regardless of the delay time detecting the EPT signal and the training signal from the transmission facsimile terminal. Resultantly, based on reception of the message signals, the reception DCME sends the EPT signal and the training signal satisfying the time stipulation to the reception facsimile terminal at the time interval between the signals satisfying the time stipulation, so that facsimile communication can be prevented from erroneously terminating.

Fourth Embodiment

Figure 8:
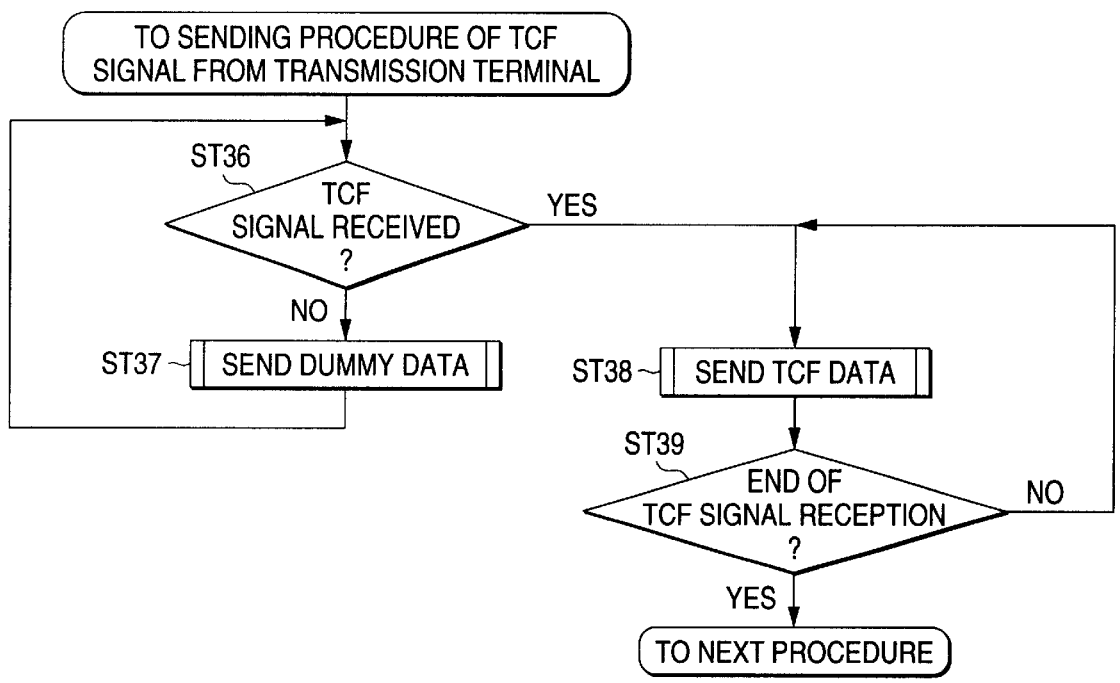
FIG. 8 is a flowchart to show the operation of facsimile signal transmission system in a transmission party according to the fourth embodiment of the invention.

FIG. 8 is a flowchart to show the operation of a facsimile signal transmission system in a transmission party according to a fourth embodiment of the invention. It shows a sending procedure of a TCF signal to reception DCME following the third embodiment. In the figure, ST36 denotes means for determining whether or not a TCF message signal has been received from a transmission facsimile terminal, ST37 denotes means for generating dummy data and sending the dummy data to reception DCME, ST38 denotes means for sending TCF data to the reception DCME, and ST39 denotes means for determining whether or not the end of the TCF signal has been received from the transmission facsimile terminal.

Next, the operation will be discussed.

For convenience of the description, the operation in transmission of a TCF signal in DCME as shown in FIG. 7 will be discussed.

First, whether or not a TCF signal has been received from a transmission facsimile terminal is determined by transmission DCME (ST16). If a TCF signal is not yet received from the a transmission facsimile terminal, dummy data is sent to reception DCME (ST37) until the TCF signal is received. After the TCF signal is received, TCF data is sent to the reception DCME (ST38) until the end of the TCF signal is received from the transmission facsimile terminal (ST39). Thus, after a FAX_DATA message signal is sent to the reception DCME, facsimile data is sent to the reception DCME without a break. Resultantly, the reception DCME can complete sending of the TCF signal correctly.

In the fourth embodiment, dummy data is sent to the reception DCME so that no break occurs between the FAX_DATA message signal and the TCF data. If fill data (00h) is used as dummy data, the reception facsimile terminal receives the correct TCF signal containing the dummy data from the reception DCME, thus facsimile communication can be executed successfully.

Fifth Embodiment

Figure 9:
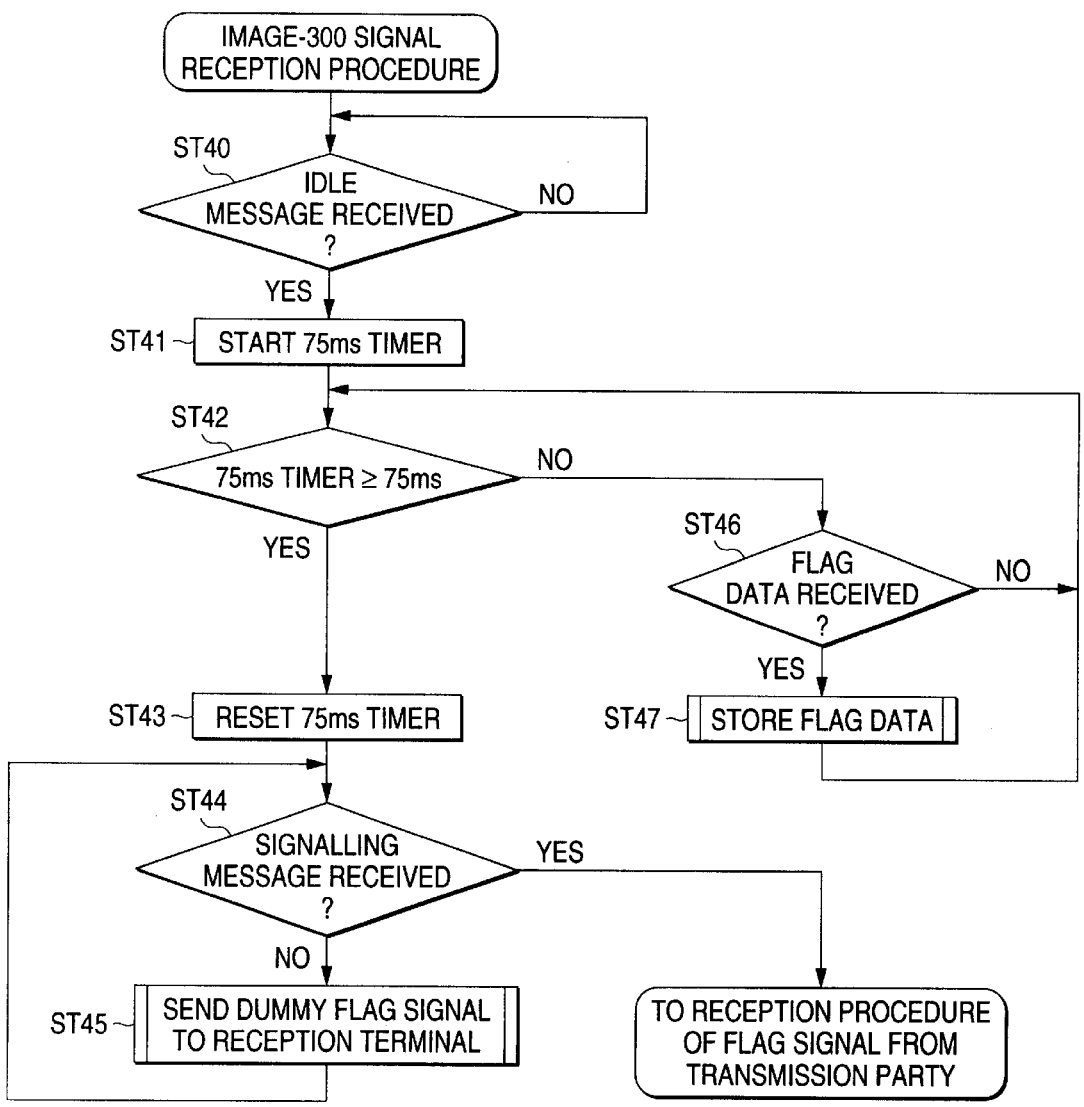
FIG. 9 is a flowchart to show the operation of a facsimile signal transmission system in a reception party according to a fifth embodiment of the invention.

FIG. 9 is a flowchart to show the operation of a facsimile signal transmission system in a reception party according to a fifth embodiment of the invention. In the figure, ST40 denotes means for determining whether or not an IDLE message signal indicating the end of an image signal has been received from a transmission party, ST41 denotes means for starting a 75-ms timer, ST42 denotes means for determining whether or not the value indicated by the 75-ms timer is 75 ms or more, ST43 denotes means for resetting the 75-ms timer, ST44 denotes means for determining whether or not a SIGNALLING message signal indicating the start of a facsimile control signal has been received from the transmission party, ST45 denotes means for sending a dummy signal to a reception facsimile terminal, ST46 denotes means for determining whether or not flag data has been received from the transmission party, and ST47 denotes means for storing the flag data received from the transmission party.

Next, the operation will be discussed.

Figure 10:
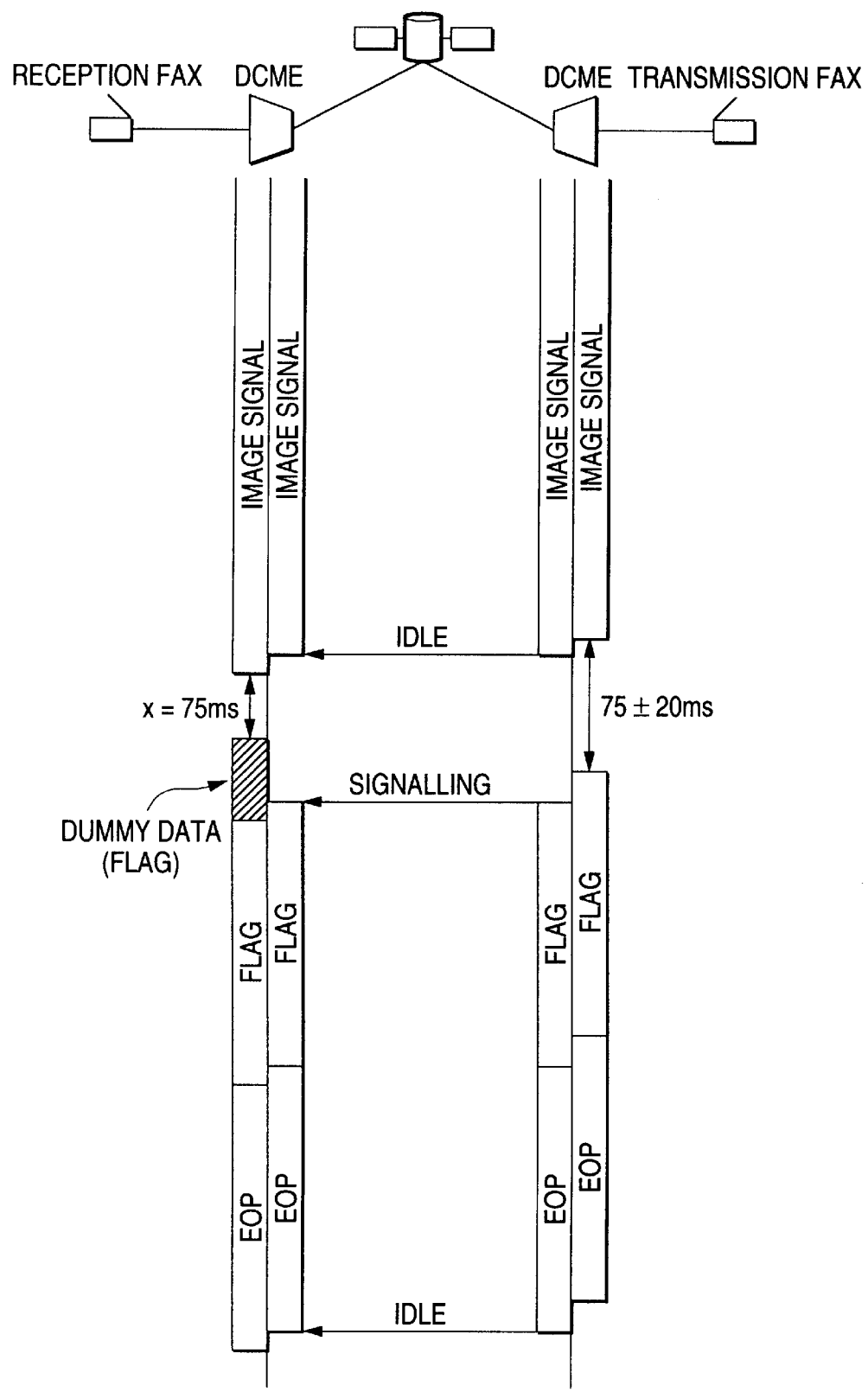
FIG. 10 is a sequence diagram to describe the operation of the facsimile signal transmission system according to the fifth embodiment of the invention.

For convenience of the description, the operation in transmission of an image signal, a flag signal, and an EOP signal in DCME as shown in FIG. 10 will be discussed.

First, reception DCME receives an IDLE message signal indicating the end of image data from transmission DCME (ST40), then starts the 75-ms timer (ST41). When the value of the 75-ms timer becomes 75 or more (ST42) regardless of whether or not a SIGNALLING message signal is received, the reception DCME resets the 75-ms timer (ST43), then sends a dummy signal to a reception facsimile terminal (ST45) until a SIGNALLING message signal is received. After receiving the SIGNALLING message signal (ST44), the reception DCME starts sending a flag signal and an EOP signal from the transmission party to the reception facsimile terminal.

As seen in the description made so far, according to the fifth embodiment, a dummy signal is sent to the reception facsimile terminal in 75 ms regardless of whether or not the SIGNALLING message signal is received from the transmission party. Resultantly, facsimile communication can be prevented from erroneously terminating.

In the fifth embodiment, a dummy signal is sent to the reception facsimile terminal so as to satisfy the stipulation of the time interval between the image signal and the flag signal. If flag data (7Eh) is used as a dummy signal, the reception facsimile terminal receives the correct flag signal containing the dummy signal from the reception DCME, thus facsimile communication can be executed successfully.

Sixth Embodiment

Figure 11:
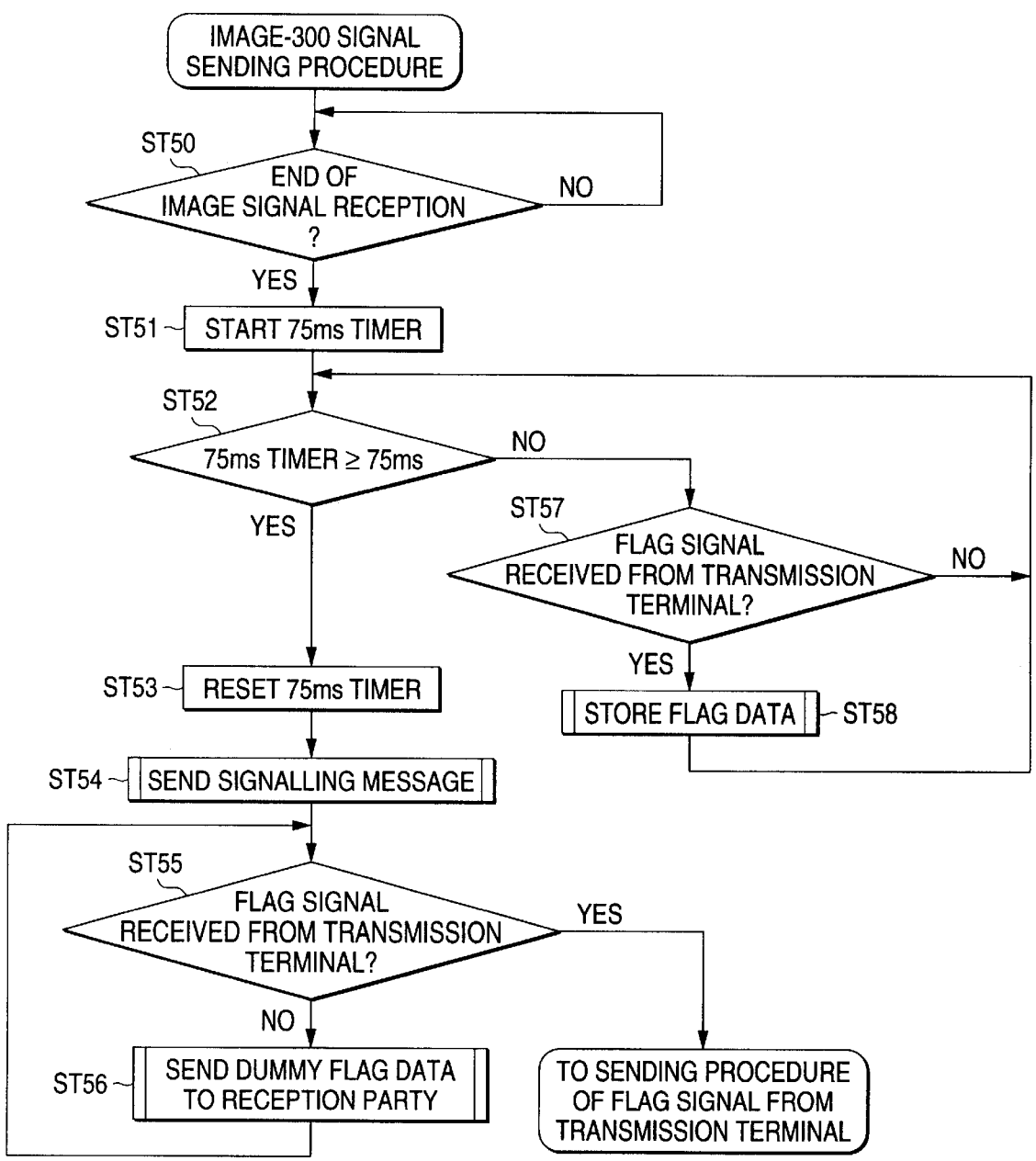
FIG. 11 is a flowchart to show the operation of a facsimile signal transmission system in a transmission party according to a sixth embodiment of the invention.

FIG. 11 is a flowchart to show the operation of a facsimile signal transmission system in a transmission party according to a sixth embodiment of the invention. In the figure, ST50 denotes means for determining whether or not reception of an image signal from a transmission facsimile terminal terminates, ST51 denotes means for starting a 75-ms timer, ST52 denotes means for determining whether or not the value indicated by the 75-ms timer is 75 ms or more, ST53 denotes means for resetting the 75-ms timer, ST54 denotes means for sending a SIGNALLING message signal to a reception party, ST55 denotes the means for determining whether or not a flag signal at the beginning of facsimile control signals has been received from the transmission facsimile terminal, ST56 denotes means for sending dummy flag data to the reception party, ST57 denotes means for determining whether or not a flag signal has been received from the transmission facsimile terminal, and ST58 denotes means for storing flag data received from the transmission facsimile terminal.

Next, the operation will be discussed.

Figure 12:
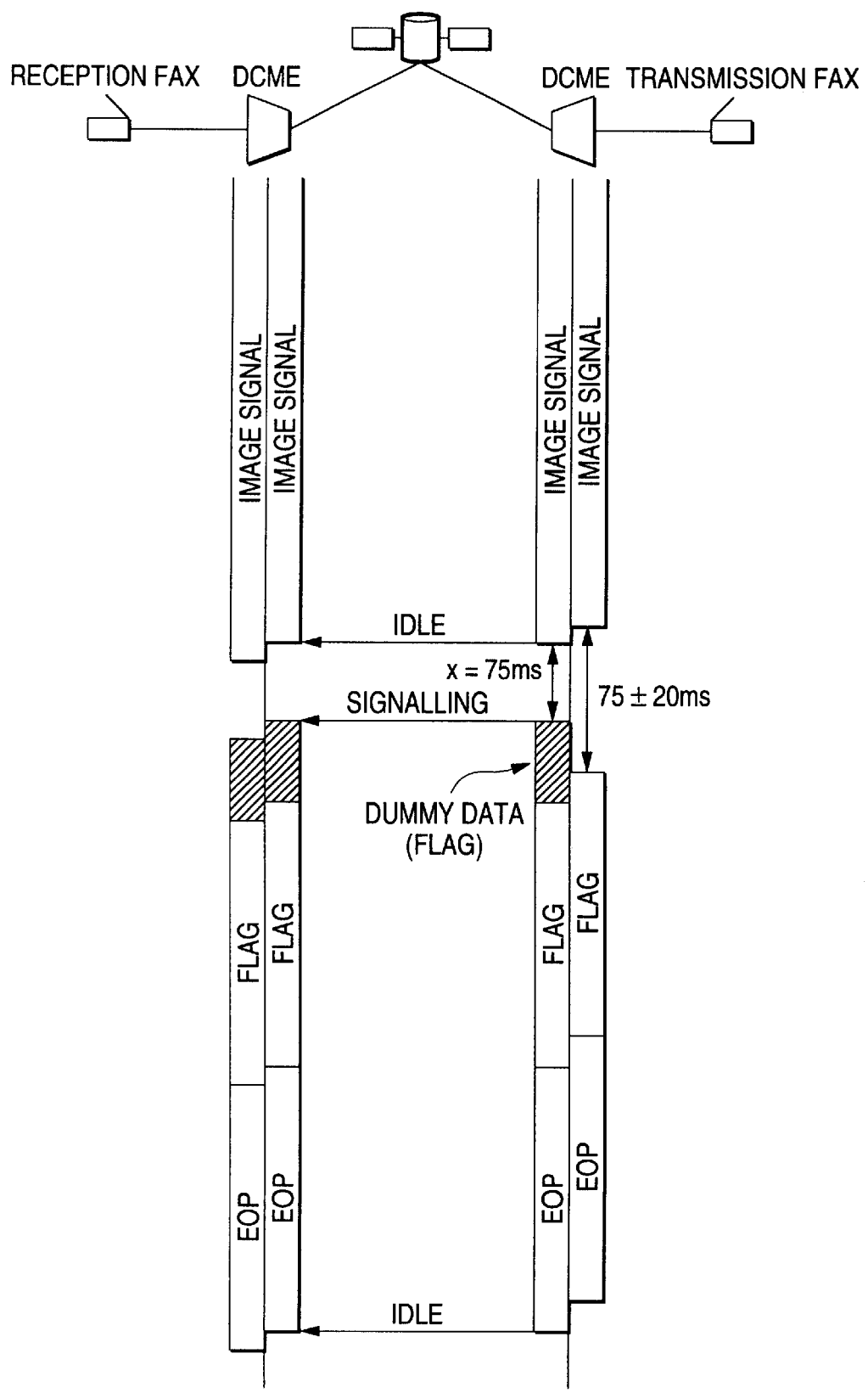
FIG. 12 is a sequence diagram to describe the operation of the facsimile signal transmission system according to the sixth embodiment of the invention.

For convenience of the description, the operation in transmission of an image signal, a flag signal, and an EOP signal in DCME as shown in FIG. 12 will be discussed.

First, transmission DCME detects the end of image data from a transmission facsimile terminal (ST50), then starts the 75-ms timer (ST51). When the value of the 75-ms timer becomes 75 ms or more (ST52) regardless of whether or not a flag signal at the beginning of facsimile control signals is received from the transmission facsimile terminal, the transmission DCME resets the 75-ms timer (ST53), then sends a SIGNALLING message signal and dummy data to a reception facsimile terminal (ST56). After receiving the flag signal at the beginning of facsimile control signals from the transmission facsimile terminal (ST55), the transmission DCME starts sending the flag signal and an EOP signal from the transmission facsimile terminal to the reception DCME.

As seen in the description made so far, according to the sixth embodiment, a dummy signal is sent to the reception DCME in 75 ms regardless of whether or not the flag signal is received from the transmission facsimile terminal. Resultantly, facsimile communication can be prevented from erroneously terminating.

In the sixth embodiment, dummy data is sent to the reception DCME so as to satisfy the stipulation of the time interval between the image signal and the flag signal. If flag data (7Eh) is used as dummy data, the reception facsimile terminal receives the correct flag signal containing the dummy signal from the reception DCME, thus facsimile communication can be executed successfully.

Seventh Embodiment

Figure 13:
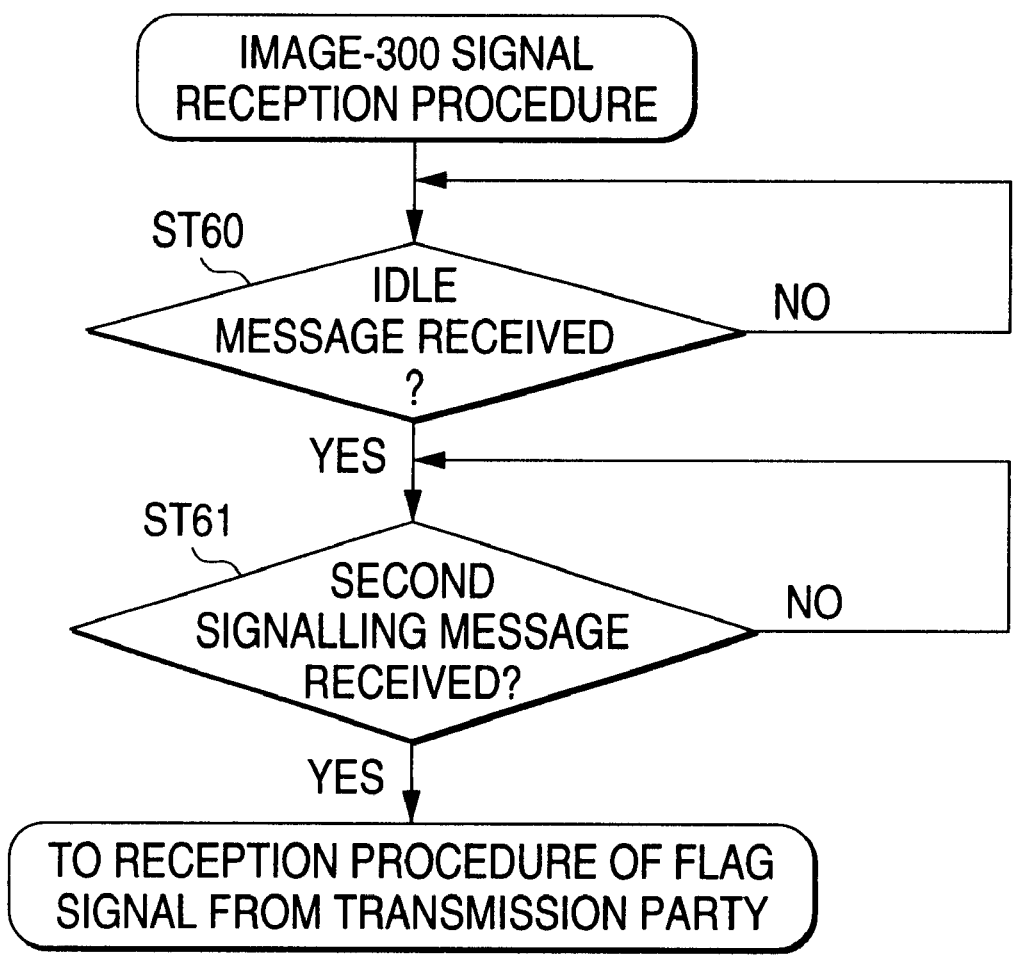
FIG. 13 is a flowchart to show the operation of a facsimile signal transmission system in a reception party according to a seventh embodiment of the invention.

FIG. 13 is a flowchart to show the operation of a facsimile signal transmission system in a reception party according to a seventh embodiment of the invention. In the figure, ST60 denotes means for determining whether or not an IDLE message signal indicating the end of an image signal has been received from a transmission party and ST61 denotes means for determining whether or not a second SIGNAL-LING message signal indicating the beginning of facsimile control signals has been received from the transmission party.

Next, the operation will be discussed.

Figure 14:
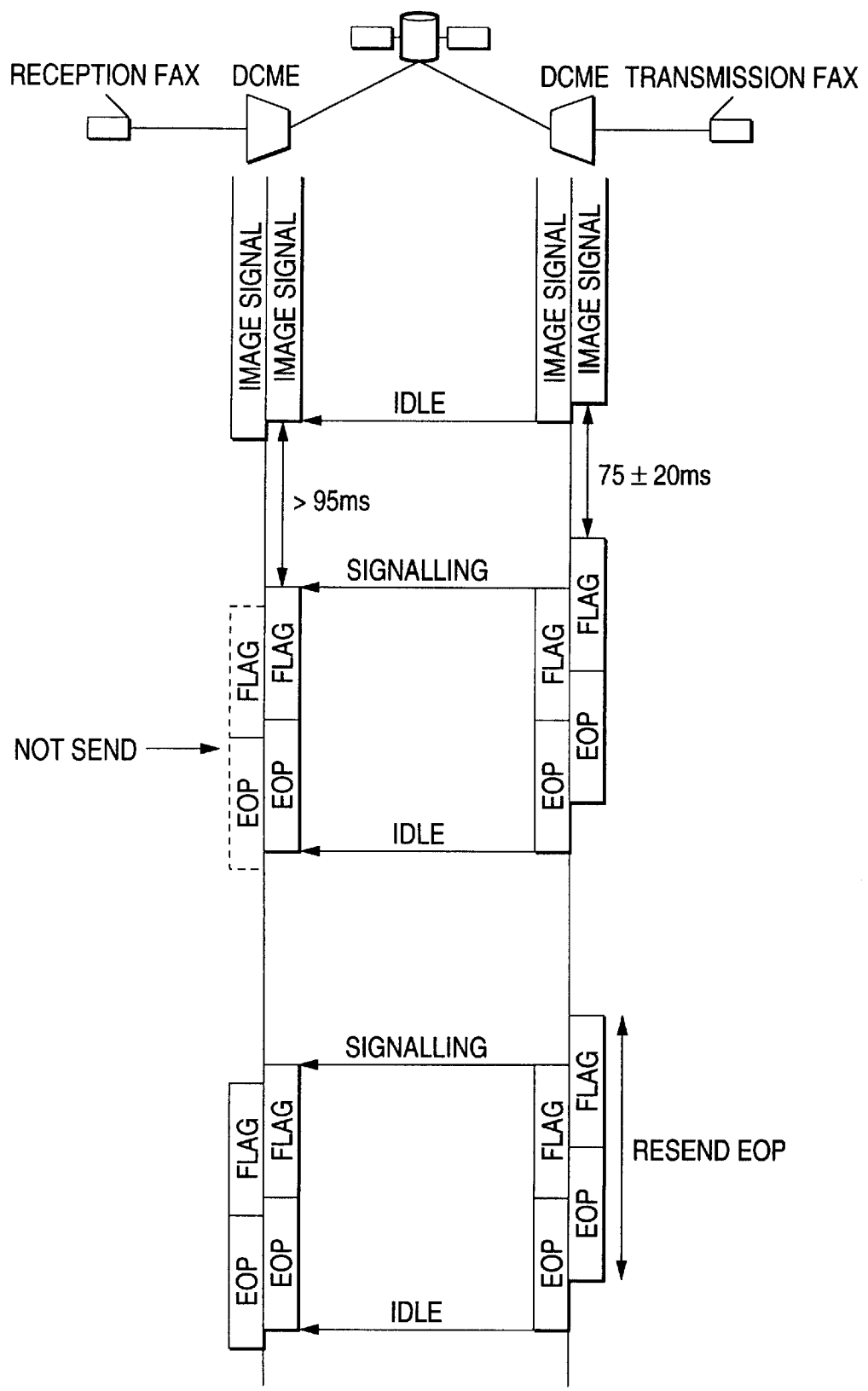
FIG. 14 is a sequence diagram to describe the operation of the facsimile signal transmission system according to the seventh embodiment of the invention.

For convenience of the description, the operation in transmission of an image signal, a flag signal, and an EOP signal in DCME as shown in FIG. 14 will be discussed.

First, reception DCME receives an IDLE message signal indicating the output end of image data from transmission DCME (ST60), then waits for a SIGNALLING message signal to be received from the transmission DCME (ST61). Then, the reception DCME receives a SIGNALLING message signal from the transmission DCME. As previously described in [Related Art], the SIGNALLING message signal may be received after the expiration of 95 ms or more since reception of the IDLE message signal. Then, at the ST61 means, the reception DCME does not send a flag signal or an EOP signal after reception of the first SIGNAL-LING message signal after reception of an image signal to a reception facsimile terminal and sends a flag signal and an EOP signal after reception of the second SIGNALLING message signal to the reception facsimile terminal.

Resultantly, the reception facsimile terminal correctly receives the image signal, the flag signal, and the EOP signal from the reception DCME, thus facsimile communication is executed successfully.

Eighth Embodiment

Figure 15:
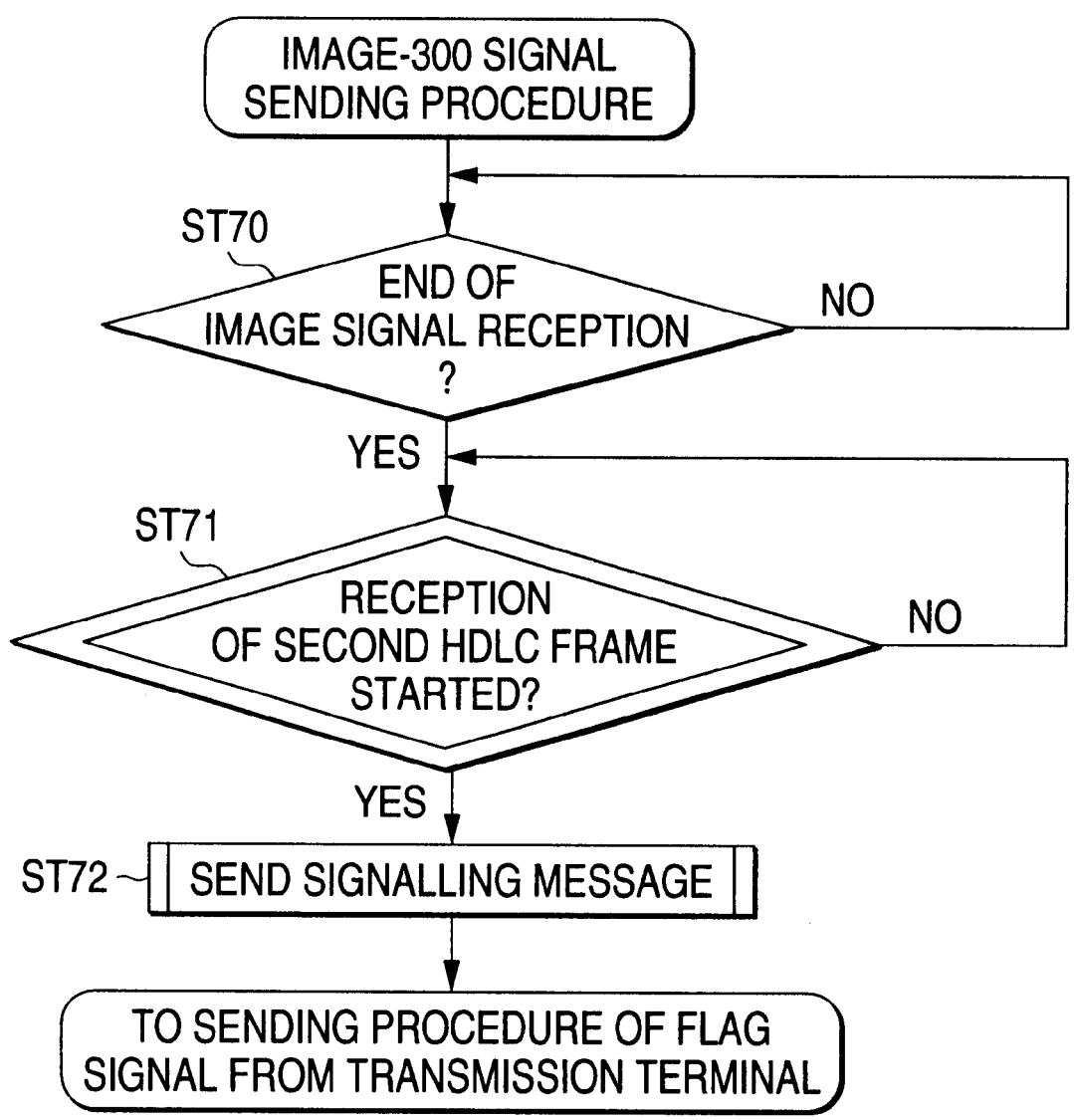
FIG. 15 is a flowchart to show the operation of a facsimile signal transmission system in a transmission party according to an eighth embodiment of the invention.

FIG. 15 is a flowchart to show the operation of a facsimile signal transmission system in a transmission party according to an eighth embodiment of the invention. In the figure, ST70 denotes means for determining whether or not reception of an image signal from a transmission facsimile terminal terminates and ST71 denotes means for determining whether or not a second flag signal indicating the beginning of facsimile control signals has been received from the transmission facsimile terminal.

Next, the operation will be discussed.

Figure 16:
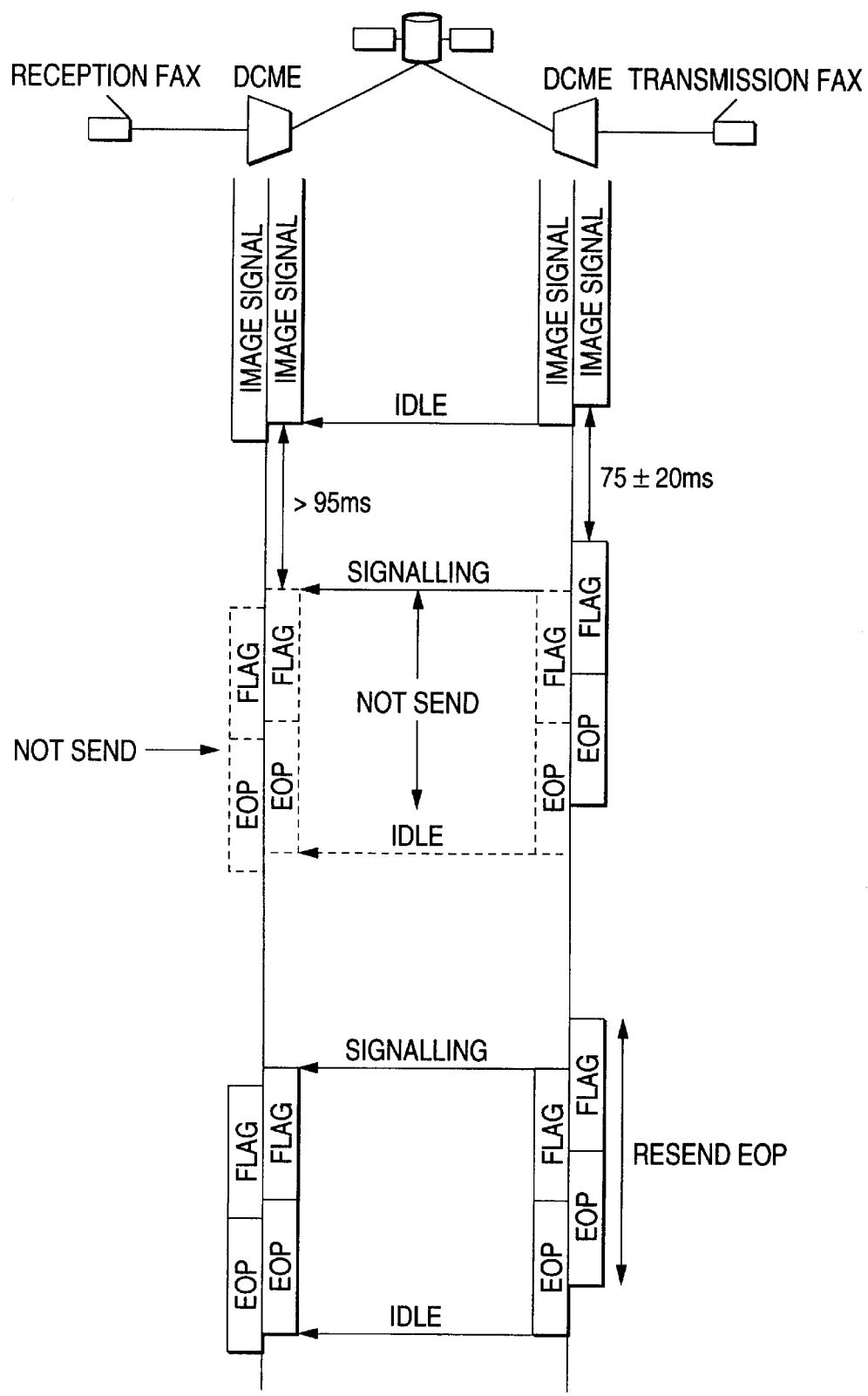
FIG. 16 is a sequence diagram to describe the operation of the facsimile signal transmission system according to the eighth embodiment of the invention.
Figure 17:
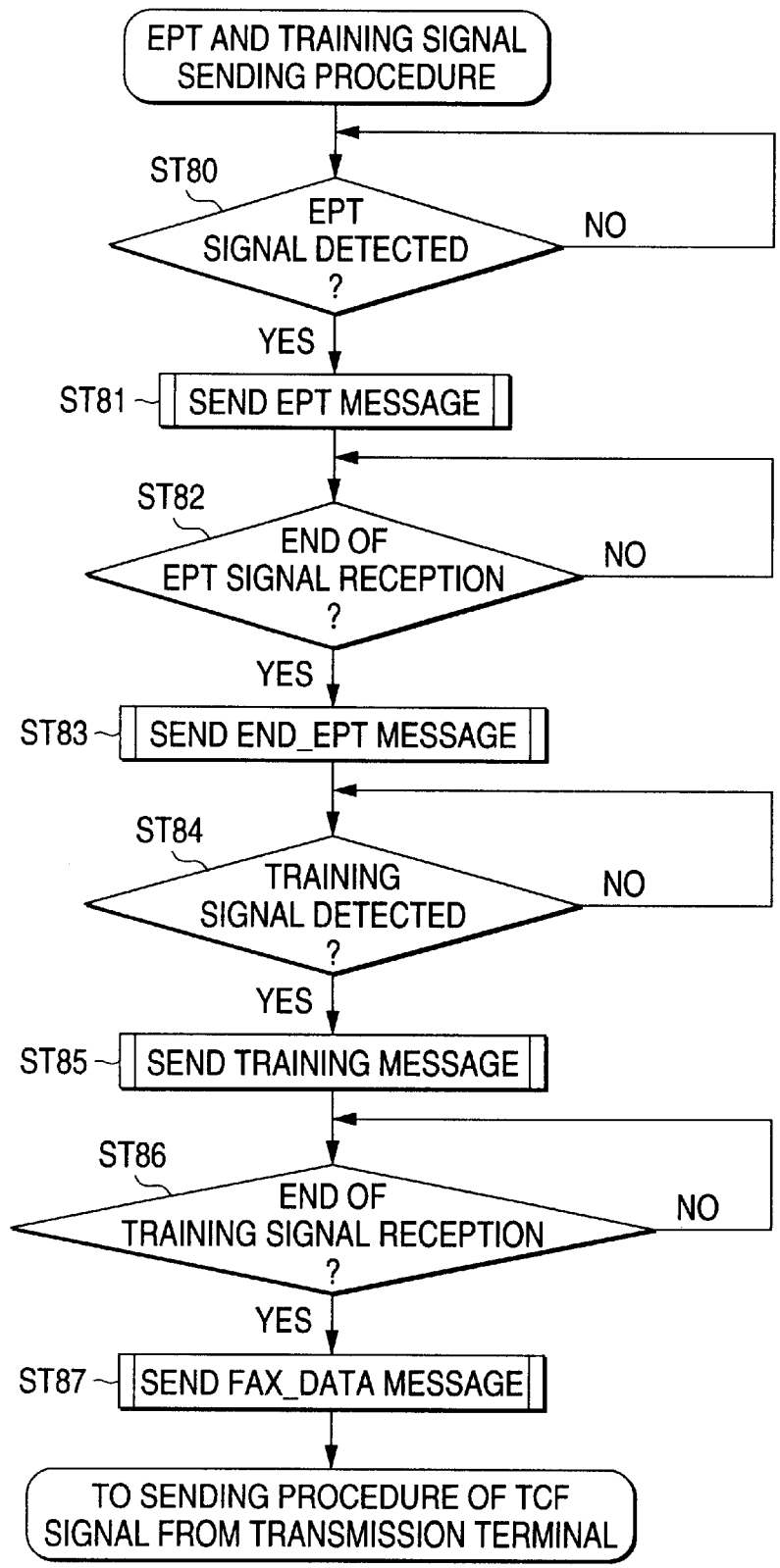
FIG. 17 is a flowchart to show a part of the operation of a facsimile signal transmission system in a transmission party in a related art.
Figure 18:
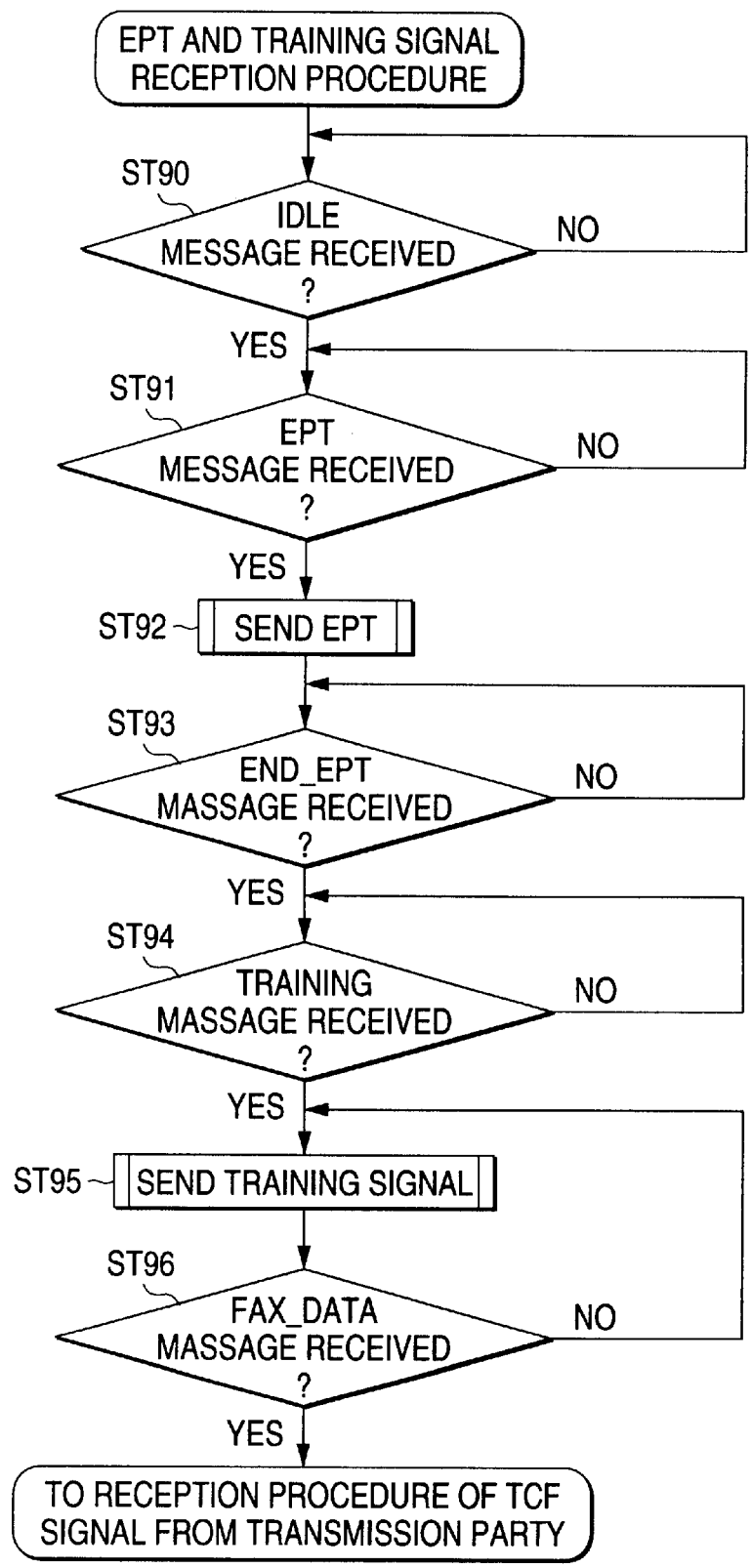
FIG. 18 is a flowchart to show a part of the operation of the facsimile signal transmission system in a reception party in the related art.
Figure 19:
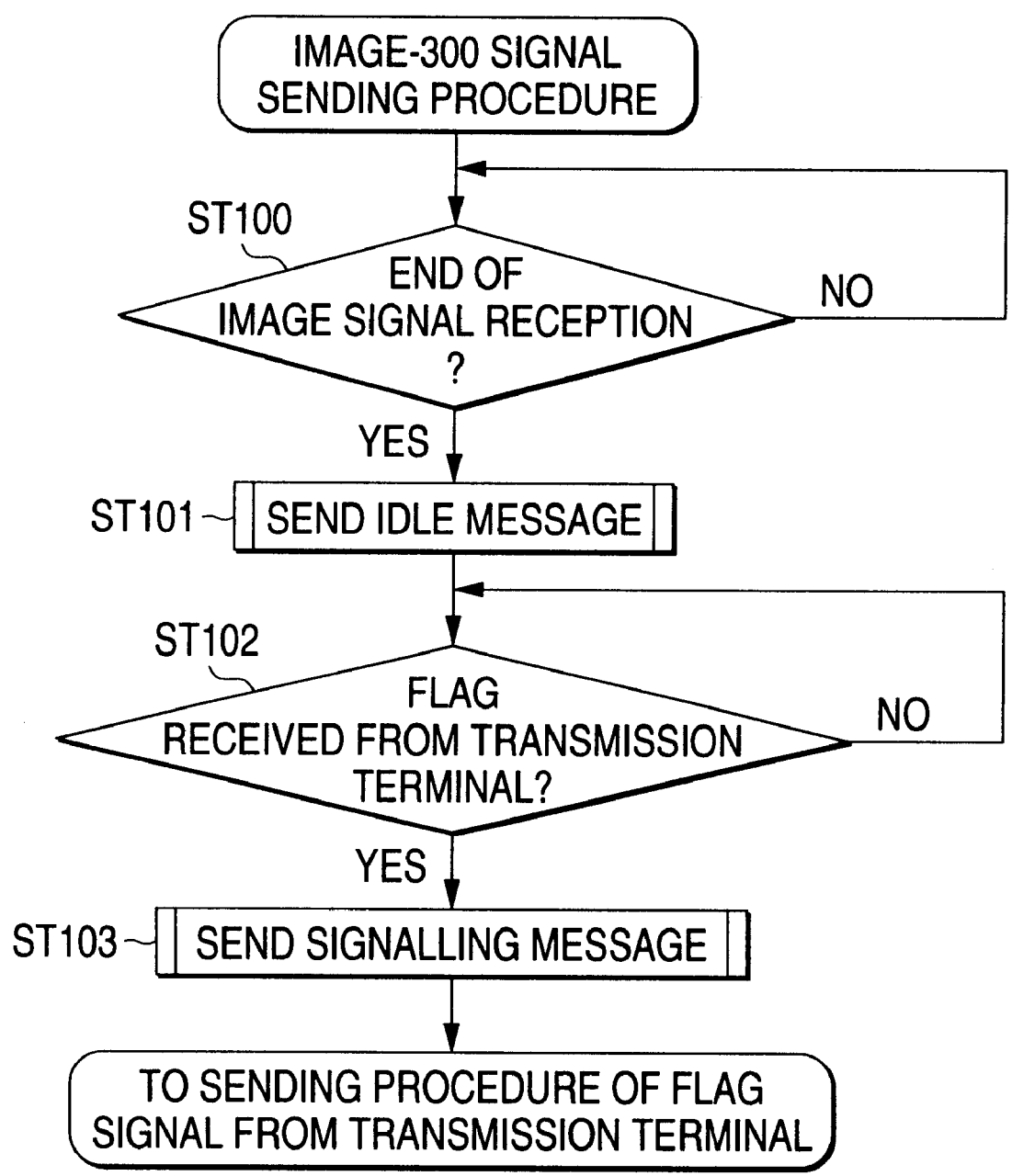
FIG. 19 is a flowchart to show a part of the operation of the facsimile signal transmission system in the transmission party in the related art (flowchart following the flowchart in FIG. 17)
Figure 20:
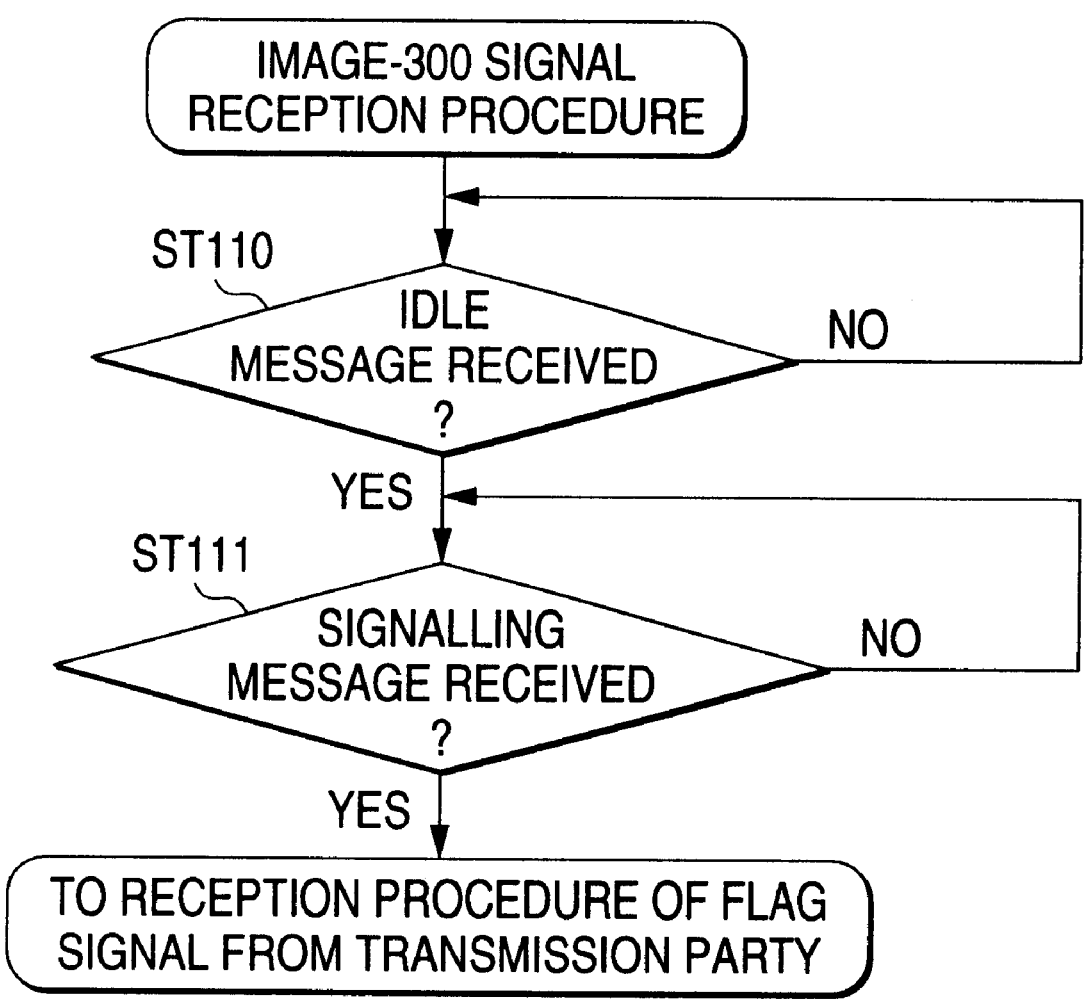
FIG. 20 is a flowchart following the flowchart in FIG. 18.
Figure 21:
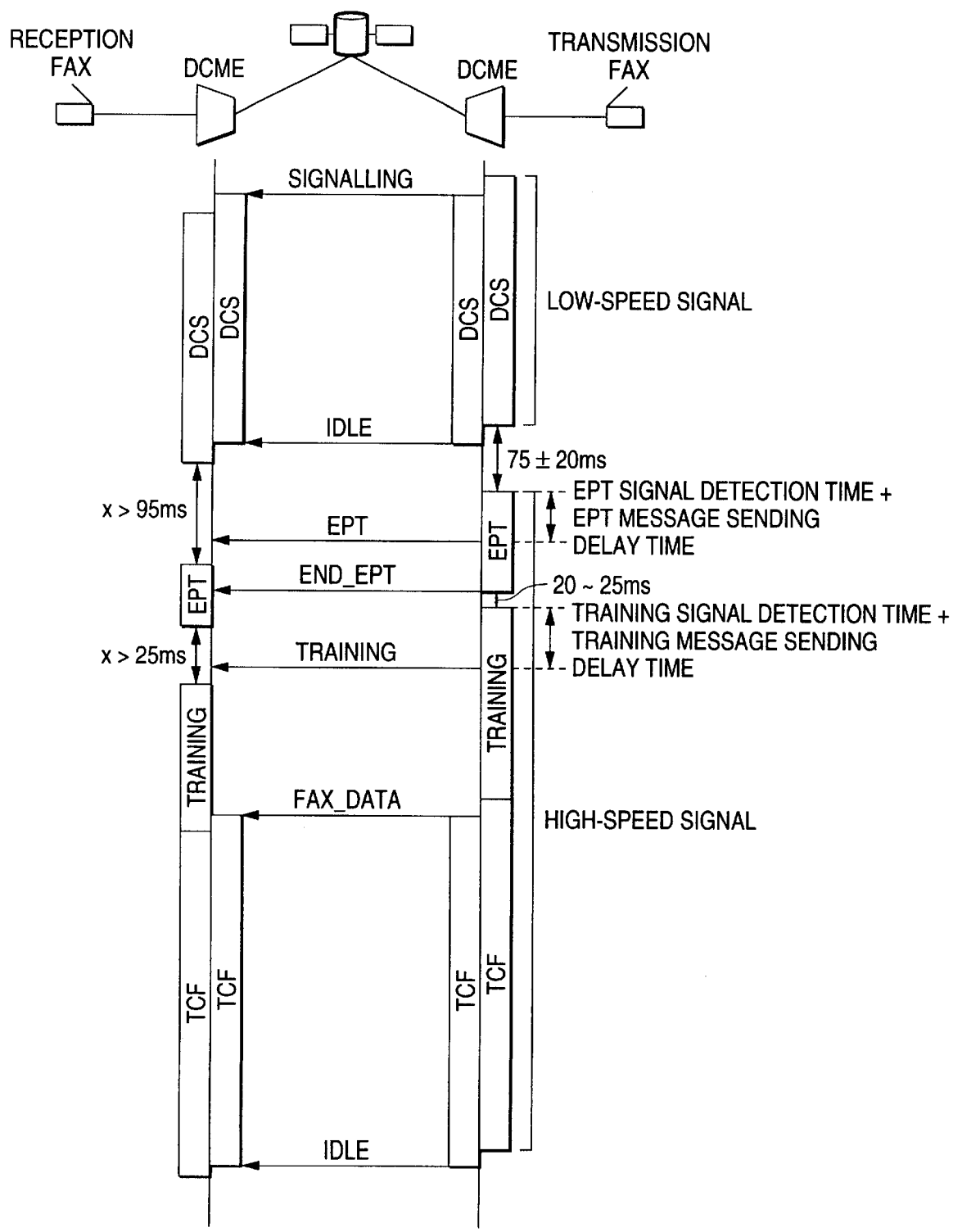
FIG. 21 is a sequence diagram to describe the operation of the facsimile signal transmission system shown in FIGS. 17 and 18.

For convenience of the description, the operation in transmission of an image signal, a flag signal, and an EOP signal in DCME as shown in FIG. 16 will be discussed.

First, transmission DCME detects the end of an image signal from a transmission facsimile terminal (ST70), then waits for a flag signal to be received from the transmission facsimile terminal. Then, the transmission DCME receives a flag signal from the transmission DCME. As previously described in [Related Art], the flag signal may be received after the expiration of 95 ms or more since detection of the end of the image signal. Then, at the ST71 means, the transmission DCME does not send the first flag signal or EOP signal after detection of the end of the image signal to reception DCME and sends the second flag signal and EOP signal to the reception DCME.

Resultantly, the reception facsimile terminal correctly receives the image signal, the flag signal, and the EOP signal from the reception DCME, thus facsimile communication is executed successfully.

As described above, according to the invention, in the facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, if an IDLE message signal output from a transmission party at the end of the DCS signal is received in a reception party, a first timer operated for a first predetermined time is started. When the first predetermined time has elapsed, sending of the EPT signal to the reception facsimile terminal is started. A second timer operated for a second predetermined time is started at the same time as sending of the EPT signal is started. When the second predetermined time has elapsed, sending of the EPT signal is terminated. A third timer operated for a third predetermined time is started at the same time as sending of the EPT signal is terminated. When the third predetermined time has elapsed, sending of the training signal to the reception facsimile terminal is started. Thus, the EPT signal and the training signal can be sent to the reception facsimile terminal for the predetermined time after the expiration of the predetermined time regardless of whether or not a message signal is received from the transmission party. Resultantly, facsimile communication can be prevented from erroneously terminating.

If the TCF signal is received from a transmission party while the training signal is being sent, TCF signal data can be stored until sending of the training signal terminates.

To output the TCF signal to the reception facsimile terminal, if a FAX_DATA message signal output from the transmission party at the end of the training signal is received in the reception party, the TCF signal is output to the reception facsimile terminal and on the other hand, while no FAX_DATA message signal is received, a dummy signal generated in the reception party is output to the reception facsimile terminal, whereby after the training signal is sent to the reception facsimile terminal, output signals are sent to the reception facsimile terminal without a break and sending of the TCF signal can be completed successfully.

In a facsimile signal transmission system for outputting a DCS signal, an EPT signal, a training signal, a TCF signal, an image signal, and a control signal of facsimile signals in sequence from a transmission facsimile terminal to a reception facsimile terminal, if the end of the DCS signal is detected in a transmission party, a first timer operated for a first predetermined time is started. When the first predetermined time has elapsed, an EPT message signal is sent to a reception party and a second timer operated for a second predetermined time is started. When the second predetermined time has elapsed, an END_EPT message signal is sent to the reception party and a third timer operated for a third predetermined time is started. When the third predetermined time has elapsed, a TRAINING message signal is sent to the reception party and after the expiration of a predetermined training time, a FAX_DATA message signal is sent. Thus, the EPT message signal, the EPT_END message signal, and the TRAINING message signal are sent to the reception DCME for the predetermined time regardless of the delay time detecting the EPT signal and the training signal from the transmission facsimile terminal. Resultantly, based on reception of the message signals, the reception DCME sends the EPT signal and the training signal satisfying the time stipulation to the reception facsimile terminal at the time interval between the signals satisfying the time stipulation, so that facsimile communication can be prevented from erroneously terminating.

If the TCF signal is received from the transmission facsimile terminal in a training time end wait state, the TCF signal can be stored until the end of the predetermined training time.

The TCF signal output from the transmission facsimile terminal is output to the reception party and on the other hand, while no TCF signal is received, a dummy signal generated in the transmission party is output to the reception party, whereby after a FAX_DATA message signal is sent to the reception DCME, facsimile data is sent to the reception DCME without a break, and the reception DCME can complete sending of the TCF signal correctly. Resultantly, facsimile communication can be prevented from erroneously terminating.

Fill data is used as the dummy signal, whereby the correct TCF signal can be sent to the reception facsimile terminal. Resultantly, facsimile communication can be prevented from erroneously terminating.

In a facsimile signal transmission system for outputting a DCS signal, an EPT signal, a training signal, a TCF signal, an image signal, and a control signal of facsimile signals in sequence from a transmission facsimile terminal to a reception facsimile terminal, if an IDLE message signal output from a transmission party at the end of the image signal is received in a reception party, a timer operated for a predetermined time is started. If a SIGNALLING message signal is received from a transmission party after the expiration of the predetermined time, sending of a flag signal received from the transmission party to the reception facsimile terminal is started and on the other hand, if no SIGNALLING message signal is received from the transmission party, a dummy signal generated in the reception party is sent to the reception facsimile terminal. Thus, a dummy signal is sent to the reception facsimile terminal regardless of whether or not the SIGNALLING message signal is received from the transmission party. Resultantly, facsimile communication can be prevented from erroneously terminating.

In a facsimile signal transmission system for outputting a DCS signal, an EPT signal, a training signal, a TCF signal, an image signal, and a control signal of facsimile signals in sequence from a transmission facsimile terminal to a reception facsimile terminal, if the end of the image signal is detected in a transmission party, a timer operated for a predetermined time is started. A SIGNALLING message signal is output to a reception party after the expiration of the predetermined time. Sending of a flag signal to the reception party is started and on the other hand, if flag signal transmission to the reception party is not started, a dummy signal generated in the transmission party is sent to the reception party. Thus, a dummy signal is sent to the reception DCME regardless of whether or not the flag signal is received from the transmission facsimile terminal. Resultantly, facsimile communication can be prevented from erroneously terminating.

Flag data is used as the dummy signal, whereby the correct flag signal can be sent to the reception facsimile terminal. Resultantly, facsimile communication can be prevented from erroneously terminating.

In a facsimile signal transmission system for outputting a DCS signal, an EPT signal, a training signal, a TCF signal, an image signal, and a control signal of facsimile signals in sequence from a transmission facsimile terminal to a reception facsimile terminal, a facsimile control signal output from a transmission party after the end of the image signal is not output from a reception party to the reception facsimile terminal and a second facsimile control signal output from the transmission party is output to the reception facsimile. terminal, whereby the reception facsimile terminal correctly receives the image signal, the flag signal, and the EOP signal from the reception DCME, and facsimile communication is executed successfully.

In a facsimile signal transmission system for outputting a DCS signal, an EPT signal, a training signal, a TCF signal, an image signal, and a control signal of facsimile signals in sequence from a transmission facsimile terminal to a reception facsimile terminal, after the end of the image signal, a facsimile control signal is not output from a transmission part to a reception party and a second facsimile control signal output from the transmission facsimile terminal is output to the reception party, whereby the reception facsimile terminal correctly receives the image signal, the flag signal, and the EOP signal from the reception DCME, and facsimile communication is executed successfully.

What is claimed is:

1. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, said system comprising the steps of:

starting a first timer operated for a first predetermined time if an IDLE message signal output from a transmission party at the end of the DCS signal is received in a reception party;

starting sending of the EPT signal to the reception facsimile terminal when the first predetermined time has elapsed;

starting a second timer operated for a second predetermined time at the same time as sending of the EPT signal being started;

terminating the sending the EPT signal when the second predetermined time has elapsed;

starting a third timer operated for a third predetermined time at the same time as sending of the EPT signal is terminated; and starting sending of the training signal to the reception facsimile terminal when the third predetermined time has elapsed.

2. The facsimile signal transmission system as claimed in claim 1 wherein to output the TCF signal to the reception facsimile terminal, if a FAX_DATA message signal output from the transmission party at the end of the training signal is received in the reception party, the TCF signal is output to the reception facsimile terminal and on the other hand, while no FAX_DATA message signal is received, a dummy signal generated in the reception party is output to the reception facsimile terminal.

3. The facsimile signal transmission system as claimed in claim 2 wherein fill data is used as the dummy signal.

4. The facsimile signal transmission system as claimed in claim 1 wherein if the TCF signal is received from a transmission party while the training signal is being sent, TCF signal data is stored until sending of the training signal terminates.

5. The facsimile signal transmission system as claimed in claim 4 wherein to output the TCF signal to the reception facsimile terminal, if a FAX_DATA message signal output from the transmission party at the end of the training signal is received in the reception party, the TCF signal is output to the reception facsimile terminal and on the other hand, while no FAX_DATA message signal is received, a dummy signal generated in the reception party is output to the reception facsimile terminal.

6. The facsimile signal transmission system as claimed in claim 5 wherein fill data is used as the dummy signal.

7. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, said system comprising the steps of:
   starting a first timer operated for a first predetermined time if the end of the DCS signal is detected in a transmission party;
   sending an EPT message signal to a reception party and starting a second timer operated for a second predetermined time when the first predetermined time has elapsed;
   sending an END_EPT message signal to the reception party and starting a third timer operated for a third predetermined time when the second predetermined time has elapsed;
   sending a TRAINING message signal to the reception party when the third predetermined time has elapsed; and
   sending a FAX_DATA message signal after the expiration of a predetermined training time.

8. The facsimile signal transmission system as claimed in claim 7 wherein the TCF signal output from the transmission facsimile terminal is output to the reception party and on the other hand, while no TCF signal is received, a dummy signal generated in the transmission party is output to the reception party.

9. The facsimile signal transmission system as claimed in claim 8 wherein fill data is used as the dummy signal.

10. The facsimile signal transmission system as claimed in claim 7 wherein if the TCF signal is received from the transmission facsimile terminal in a training time end wait state, the TCF signal is stored until the end of the predetermined training time.

11. The facsimile signal transmission system as claimed in claim 10 wherein the TCF signal output from the transmission facsimile terminal is output to the reception party and on the other hand, while no TCF signal is received, a dummy signal generated in the transmission party is output to the reception party.

12. The facsimile signal transmission system as claimed in claim 11 wherein fill data is used as the dummy signal.

13. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, said system comprising the steps of:
   starting a timer operated for a predetermined time if an IDLE message signal output from a transmission party at the end of the image signal is received in a reception party;
   if a SIGNALLING message signal is received from a transmission party after the expiration of the predetermined time, starting sending of a flag signal received from the transmission party to the reception facsimile terminal, and on the other hand, if no SIGNALLING message signal is received from the transmission party, sending a dummy signal generated in the reception party to the reception facsimile terminal.

14. The facsimile signal transmission system as claimed in claim 13 wherein flag data is used as the dummy signal.

15. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, said system comprising the steps of:
   starting a timer operated for a predetermined time if the end of the image signal is detected in a transmission party;
   outputting a SIGNALLING message signal to a reception party and starting sending of a f lag signal to the reception party after the expiration of the predetermined time;
   if flag signal transmission to the reception party is not started, a dummy signal generated in the transmission party is sent to the reception party.

16. The facsimile signal transmission system as claimed in claim 15 wherein flag data is used as the dummy signal.

17. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, wherein a first facsimile control signal output from a transmission party after the end of the image signal is not output from a reception party to the reception facsimile terminal and a second facsimile control signal output from the transmission party is output to the reception facsimile terminal.

18. A facsimile signal transmission system for outputting a digital command signal (DCS signal), an echo protect tone signal (EPT signal), a training signal, a training check signal (TCF signal), an image signal, and a control signal of facsimile signals in sequence from a transmission facsimile terminal to a reception facsimile terminal, wherein after the end of the image signal, a first facsimile control signal is not output from a transmission party to a reception party and a second facsimile control signal output from the transmission facsimile terminal is output to the reception party.

* * * * *